(12) United States Patent
Beaudoin et al.

(10) Patent No.: US 7,096,193 B1
(45) Date of Patent: Aug. 22, 2006

(54) FACILITATING COMMERCE AMONG CONSUMERS AND SERVICE PROVIDERS BY MATCHING READY-TO-ACT CONSUMERS AND PRE-QUALIFIED SERVICE PROVIDERS

(75) Inventors: Michael J. Beaudoin, Evergreen, CO (US); Rodney S. Rice, Evergreen, CO (US)

(73) Assignee: ServiceMagic, Inc., Golden, CO (US)

( * ) Notice: Subject to any disclaimer, the term of this patent is extended or adjusted under 35 U.S.C. 154(b) by 0 days.

(21) Appl. No.: 09/574,909

(22) Filed: May 19, 2000

Related U.S. Application Data

(60) Provisional application No. 60/135,522, filed on May 21, 1999.

(51) Int. Cl.
*G06Q 30/00* (2006.01)
(52) U.S. Cl. .................... 705/26; 705/8; 705/9
(58) Field of Classification Search .............. 705/25, 705/26, 10, 8, 9, 11
See application file for complete search history.

(56) References Cited

U.S. PATENT DOCUMENTS

| | | | | |
|---|---|---|---|---|
| 5,117,353 | A | * | 5/1992 | Stipanovich et al. ......... 705/11 |
| 5,758,328 | A | * | 5/1998 | Giovannoli ................. 705/26 |
| 5,761,648 | A | | 6/1998 | Golden et al. |
| 5,893,098 | A | | 4/1999 | Peters et al. |
| 5,907,617 | A | | 5/1999 | Ronning |
| 6,049,776 | A | * | 4/2000 | Donnelly et al. .............. 705/8 |
| 6,366,925 | B1 | * | 4/2002 | Meltzer et al. ................ 705/6 |
| 6,385,594 | B1 | | 5/2002 | Lebda et al. |
| 6,446,053 | B1 | | 9/2002 | Elliott |

(Continued)

FOREIGN PATENT DOCUMENTS

WO    WO 98/49642    * 11/1998

OTHER PUBLICATIONS

"Improvenet matches homeowners, contractor," Bill Rumbler, Chicago Sun—Times, May 2, 1999, p. 3.*

(Continued)

*Primary Examiner*—Yogesh C. Garg
(74) *Attorney, Agent, or Firm*—King & Spalding LLP

(57) ABSTRACT

A method and apparatus are provided for matching ready-to-act consumers and pre-qualified service providers. According to one aspect of the present invention, the Internet is used to attempt to solve communications problems and to achieve efficiency in Consumer-to-Business commerce transactions. Initially, a database of pre-qualified service providers is established. Then, a description of the consumer's needs may be extracted from a consumer using decision trees appropriate for the desired task. Subsequently, the consumer needs are packaged and presented to multiple service providers that meet a set of predetermined qualifications. The consumer needs may be presented, for example, by way of a set of heterogeneous communication devices depending upon preferences supplied by the service providers. For example, the set of heterogeneous communication devices may include facsimile, pager, mobile phone, home phone, office phone, Interactive Voice Response (IVR) unit, email, etc. The service providers may choose to submit a response for the consumer's needs or reject the task. After a sufficient number of responses have been received from the pre-qualified service providers, they are presented to the consumer. The consumer may then select from the pre-qualified service providers based upon one or more objective and/or subjective factors associated with the pre-qualified service providers. For example, objective service provider qualification information may be presented to the consumer along with the service provider responses. In addition, a database of consumer-generated service provider ratings and/or reviews may be maintained and made available for consumer queries.

20 Claims, 12 Drawing Sheets

U.S. PATENT DOCUMENTS

| | | | |
|---|---|---|---|
| 6,466,914 | B1 | 10/2002 | Mitsuoka et al. |
| 6,611,816 | B1 | 8/2003 | Lebda et al. |
| 6,868,389 | B1 * | 3/2005 | Wilkins et al. ............... 705/10 |
| 2005/0010467 | A1 * | 1/2005 | Dietz et al. .................... 705/9 |

OTHER PUBLICATIONS

"Way to find contractor just improved greatly," Joseph Szadkowski, Washington Times, Washington, Mar. 11, 1999, p. E3.*

"Homeowners find contractors on the Internet," Beth Belton, USA Today, Arlington, Apr. 13, 1999, p. 02B.* www.//web.archive.org/web/*/www.Improvenet.com [Internet archiving program], retrieved on Nov. 3, 2002 <internet>, Dec. 21, 1996-Nov. 26, 2002.*

Business Editors; "Improvenet Launches Contractor Watch: A Free, Nationwide Contractor Quality Tracking Network For Homeowners"; Business Wire; New York; Sep. 2, 1998; p. 1; extracted from proquest database on Jul. 18, 2005.*

NewHomeNetwork.com, [retrieved on Jun. 13, 2000]. Retrieved from the Internet <URL:http://www.newhomenetwork.com>.

HouseNet Site Tools About Us Page, [retrieved on Jun. 13, 2000]. Retrieved from the Internet <URL:http://www.housenet.com/sitetools/aboutus/history.asp>.

The Home Depot: Depot Services, [retrieved on Jun. 13, 2000]. Retrieved from the Internet <Partial URL: . . . /index.jsp?BV_SessionID=@@@@0467023577.0958405440@@@@&BV_EngineID=falhkf . . . >.

OurHouse.com, [retrieved on Jun. 13, 2000]. Retrieved from the Internet <URL: http://www.ourhouse.com/cgi-bin/index.jsp?>.

OurHouse.com, [retrieved on Jun. 13, 2000]. Retrieved from the Internet <Partial URL: . . . /services_zip.jsp?BV_SessionID=@@@@0419847952.0958405872@@@@&BV_EngineID=. . . >.

Yahoo! Shopping—Home and Garden: Home Impromvent, Retrieved from the Internet <URL:http/shopping.yahoo.com/Home_and_Garden/Home_Improvement/>.

OurHouse.com, brochure entitled "Just Because You Could Do It Yourself Doesn't Mean You Should"; 2000.

* cited by examiner

FACILITATING COMMERCE AMONG CONSUMERS AND SERVICE PROVIDERS BY MATCHING READY-TO-ACT CONSUMERS AND PRE-QUALIFIED SERVICE PROVIDERS

This application claims the benefit of U.S. Provisional Application No. 60/135,522, filed May 21, 1999.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of Consumer-to-Business commerce. More particularly, the invention relates to a method and apparatus for facilitating commerce among consumers and service providers.

2. Description of the Related Art

The local service economy is dominated by inefficiency. Many factors contribute to this inefficiency. For example, consumers have difficulties identifying appropriate service providers to meet their needs; and consumers cannot readily distinguish relative service provider quality. In addition, there is an inherent knowledge gap between consumers and service providers. Consequently, consumers and service providers experience difficulty communicating with one another. Furthermore, the ability to create a competitive marketplace is hindered by the consumers' inability to easily identify and communicate with multiple service providers.

In light of the foregoing, what is needed is an intelligent mechanism to match educated, ready-to-act consumers and pre-qualified service providers.

BRIEF SUMMARY OF THE INVENTION

A method and apparatus are described for matching ready-to-act consumers and pre-qualified service providers. According to one aspect of the present invention, the Internet is used to attempt to solve communications problems and to achieve efficiency in Consumer-to-Business commerce transactions. Initially, a database of pre-screened service providers is established. Then, a description of the consumer's service needs may be extracted from a consumer using decision trees appropriate for the desired task. This experience may be enhanced by the provision of targeted, relevant information that provides education in context for the consumer. Subsequently, the consumer needs are packaged and presented to multiple service providers that meet a set of predetermined qualifications. The consumer needs may be presented, for example, by way of a set of heterogeneous communication devices depending upon preferences supplied by the service providers. The service providers may choose to submit a quote for the consumer's needs, indicate a desire to be referred, or reject the task. Importantly, according to one embodiment, the system works in a persistent manner to secure responses from an appropriate number of service providers. After a sufficient number of responses have been received from the pre-qualified service providers, they are presented to the consumer. The consumer may then select from the pre-qualified service providers based upon one or more objective and/or subjective factors associated with the pre-qualified service providers. Such objective and subjective information may be collected by the system and presented to consumers.

According to another aspect of the invention, the system may automatically initiate follow-up communications with the consumers and service providers to collect information regarding confirmation of service transactions, such information may form the basis for the business model and/or the subjective information provided to consumers.

Other features of the present invention will be apparent from the accompanying drawings and from the detailed description which follows.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION OF THE INVENTION

A method and apparatus for matching ready-to-act consumers and pre-qualified service providers are described. Broadly stated, according to the present invention, Consumer-to-Business commerce transactions are sought to be facilitated by pre-qualifying both consumers and service providers and matching consumers with pre-qualified service providers. For example, according to one embodiment of the present invention, using information provided by the consumer, such as the consumer's address, schedule, cost expectations, etc., a set of pre-qualified service providers may be identified for solicitation of responses, e.g., quotes or referrals. These and other features seek to provide a powerful and flexible Consumer-to-Business commerce facilitator solution.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

An Exemplary Computer System

Figure 1:
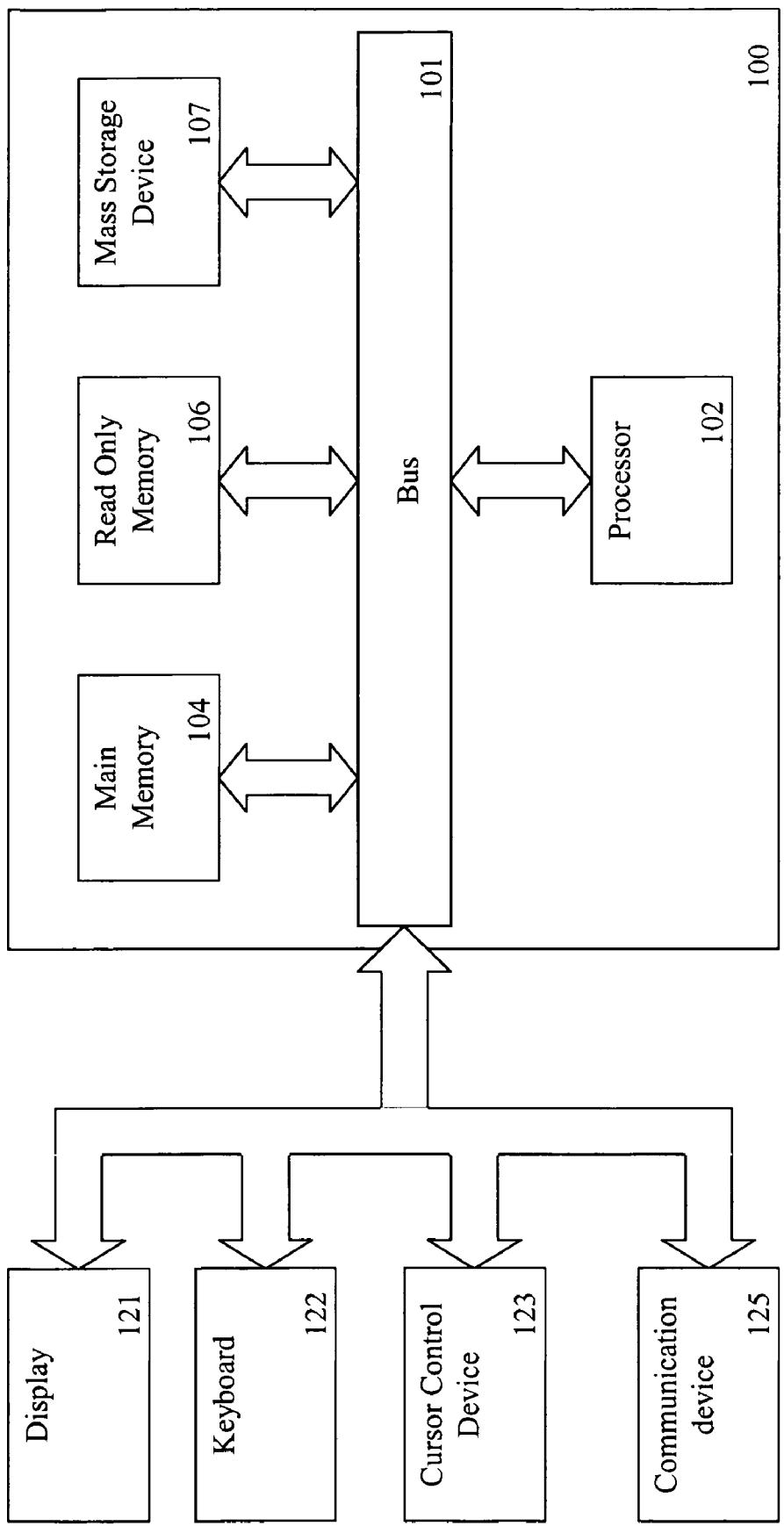
FIG. 1 is an example of a typical computer system upon which one embodiment of the present invention may be implemented.

FIG. 1 describes a computer system 100 representing an exemplary target system upon which features of the present invention may be implemented. Computer system 100 comprises a bus or other communication means 101 for communicating information, and a processing means such as processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102.

A data storage device 107 such as a magnetic disk or optical disc and its corresponding drive may also be coupled to computer system 100 for storing information and instructions. Computer system 100 can also be coupled via bus 101 to a display device 121, such as a cathode ray tube (CRT) or Liquid Crystal Display (LCD), for displaying information to an end user. For example, graphical and/or textual indications of installation status, time remaining in the trial period, and other information may be presented to the prospective purchaser on the display device 121. Typically, an alphanumeric input device 122, including alphanumeric and other keys, may be coupled to bus 101 for communicating information and/or command selections to processor 102. Another type of user input device is cursor control 123, such as a mouse, a trackball, or cursor direction keys for communicating direction information and command selections to processor 102 and for controlling cursor movement on display 121.

A communication device 125 is also coupled to bus 101. The communication device 125 may include a modem, a network interface card, or other well-known interface devices, such as those used for coupling to Ethernet, token ring, or other types of physical attachment for purposes of providing a communication link to support a local or wide area network, for example. In any event, in this manner, the computer system 100 may be coupled to a number of clients and/or servers via a conventional network infrastructure, such as a company's Intranet and/or the Internet, for example.

It is appreciated that a lesser or more equipped computer system than the example described above may be desirable for certain implementations. Therefore, the configuration of computer system 100 will vary from implementation to implementation depending upon numerous factors, such as price constraints, performance requirements, technological improvements, and/or other circumstances.

It should be noted that, while the steps described herein may be performed under the control of a programmed processor, such as processor 102, in alternative embodiments, the steps may be fully or partially implemented by any programmable or hardcoded logic, such as Field Programmable Gate Arrays (FPGAs), TTL logic, or Application Specific Integrated Circuits (ASICs), for example. Additionally, the method of the present invention may be performed by any combination of programmed general purpose computer components and/or custom hardware components. Therefore, nothing disclosed herein should be construed as limiting the present invention to a particular embodiment wherein the recited steps are performed by a specific combination of hardware components.

Platform Overview

Figure 2:
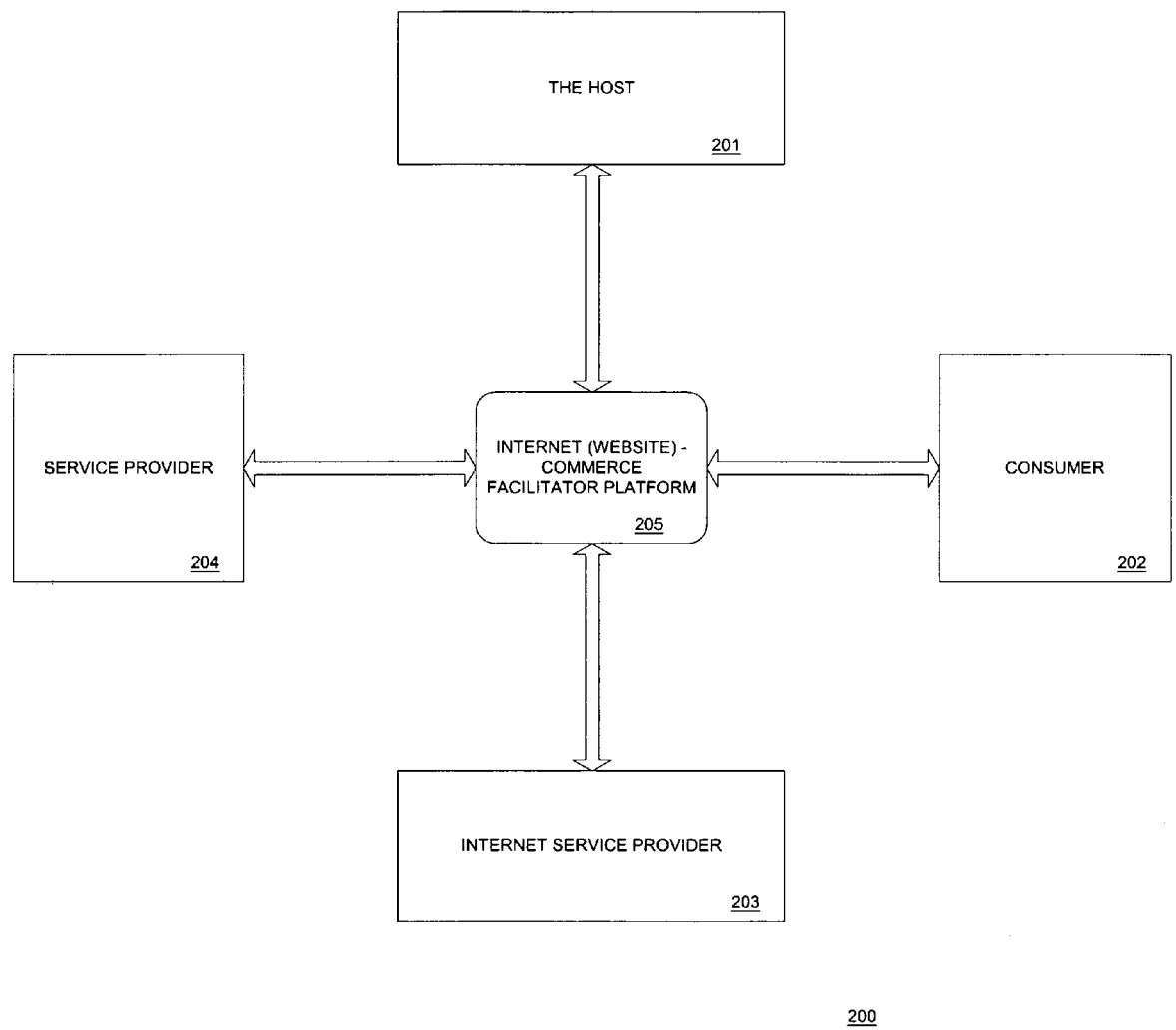
FIG. 2 is a block diagram illustrating the internet-based commerce facilitator platform according to one embodiment of the present invention.

According to one embodiment, as shown in FIG. 2, an internet-based platform, the commerce facilitator platform 205, is provided that supports the U.S. local service economy and facilitates commerce between Consumers 202 and Service Providers 204. Specifically, in this example, a robust information environment is provided that brings Consumers 202 and Service Providers together 204, facilitating efficient identification of appropriate and pre-qualified Service Providers 204, supports more efficient communications, and provides a competitive environment where Consumers 202 can easily comparison shop based on full services quotes and subjective consumer ratings and reviews of local Service Providers 204.

The Internet-based commerce facilitator platform website 205 is a common platform, generated by the Host 201, provides all the facilities for the consumers 202 and the service providers 204 to do business. Both the consumers 202 and the service providers 204 can access the website using their preferred Internet service providers 203, such as America On-line and CompuServe.

The commerce facilitator platform 205 assists Consumers 202 in identifying their need (and potentially troubleshooting), by bringing reliable qualitative information regarding Service Providers 204 to them, and facilitating a competitive environment by enhancing the Consumer-to-Service Provider communication process such that seeking multiple quotes is convenient.

In addition, the commerce facilitator platform 205 includes a value proposition for Service Providers 204 that delivers efficiency to their business by delivering Consumers 202 with specific service needs, streamlining the sales process, facilitating smooth and accurate communications, and reducing reliance on onsite physical review for estimating and quoting potential projects. The commerce facilitator platform 205 will bring ready-to-act Consumers 202 to the right Service Providers 202 in an efficient manner, thereby reducing marketing and estimating costs.

With this type of model, revenues may be generated from one or more of the following: (i) charging participating Service Providers 204 a commission on revenues attributable to referrals or quotes facilitated by the commerce facilitator platform 205; (ii) membership fees paid by either Consumers 202 or Service Providers 204 or both; (iii) selling advertising and promotional opportunities available through its web site and targeted consumer traffic; (iv) providing business services to Service Providers 204, such as communications and web services (non-commerce facilitator platform answering/paging service; web site development & hosting; on-line merchant account facilitation; bill presentment/payment; etc.), and (v) offering value-added services to its Consumers 202.

Figure 3:
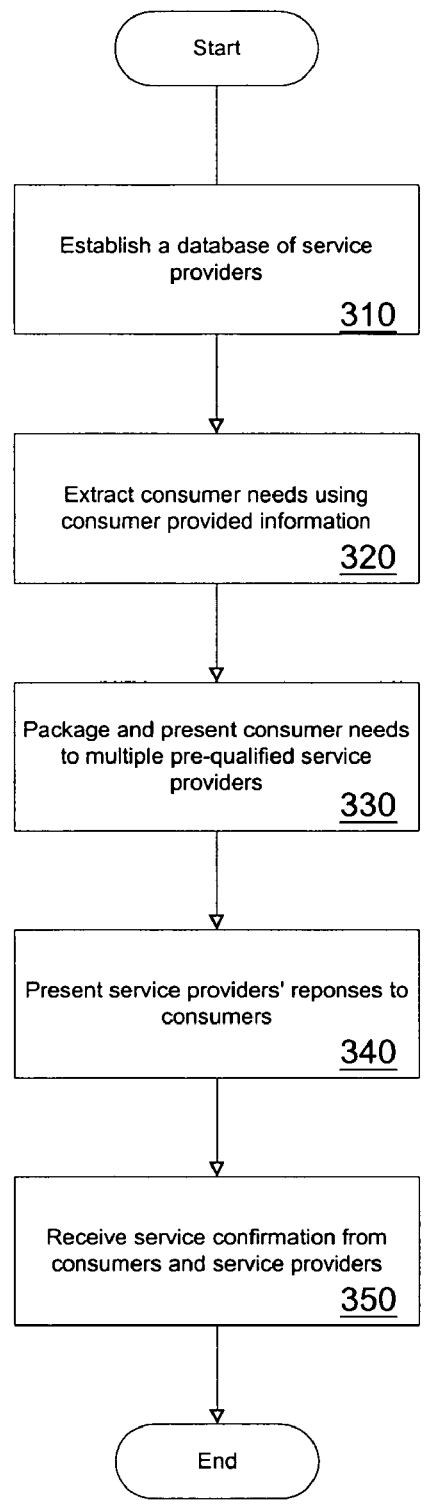
FIG. 3 illustrates exemplary end-to-end communications between consumers and service providers according to one embodiment of the present invention.

FIG. 3 illustrates exemplary end-to-end communications between consumers and service providers according to one embodiment of the present invention. Initially, a database of pre-screened service providers is established, based on the information received during the pre-qualification process 310. Similarly, another database is established, based on the information provided by the consumers during an interactive question and answer interview session 320. Consumer needs are then packaged and provided to multiple service providers 330. Service providers' responses are then forwarded to individual consumers, so they can decide whether to sign up for the service 340. An automatic follow-up communication is then initiated to receive service confirmation and feedback from the consumers and the service providers 350.

Service Provider Enrollment Process (SPEP)

Figure 4:
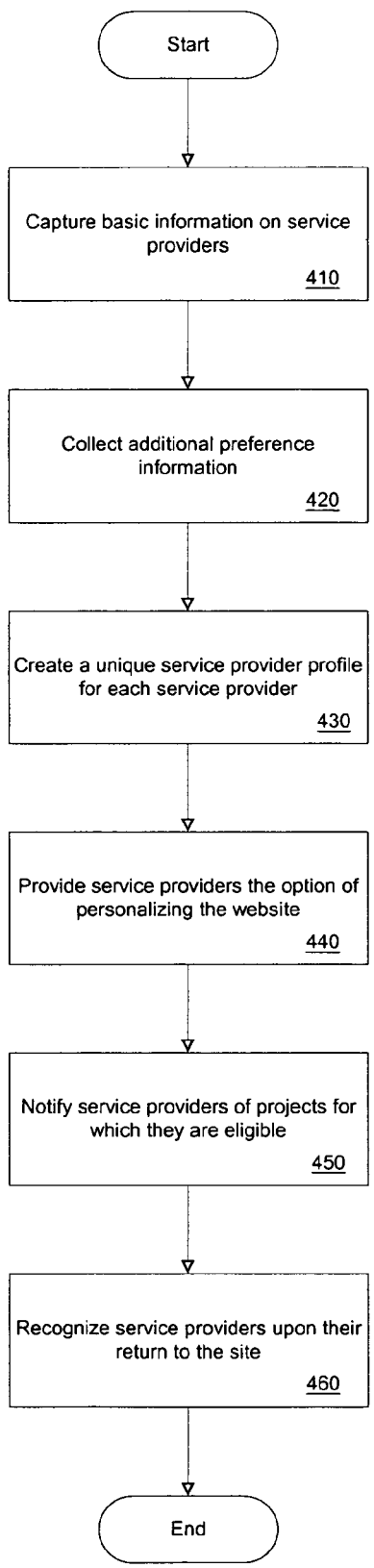
FIG. 4 illustrates a service provider enrollment process according to one embodiment of the present invention.

FIG. 4 illustrates the Service Provider Enrollment Process 400, according to one embodiment of the present invention, which is essential for the pre-qualification process and for creating the database of pre-screened service providers. Either upon "first access" of the service, or when the service provider makes a decision to participate in the service and be eligible for inclusion in the Consumer-driven Service Request (CSR) Process, the service provider is required to enroll, providing certain basic information 410, such as business name, address and number of years in operation. The system may require additional preference information 420 to support the most effective CSR matching process. The enrollment process then initiates the creation of a unique Service Provider Profile 430 for each service provider. In alternative embodiments, other methods of service provider enrollment may be employed, such as live telephone operator, email, and/or fax forms.

Website Personalization. The service providers have the capability to "personalize" their website home page once they have been properly enrolled 440. Their preferences could include a summary of past services referred or quoted through the service, a status of current CSR available to the service provider, etc.

CSR Response Process. The service providers are then notified of projects that have been submitted to the service for which the service provider is eligible 450. The service provider indicates an initial "Yes" or "No" with regard to their interest, and ultimately may submit a "quote" or further confirmation of interest for a "referral". The responses are developed and formatted based on a template to ensure consistency and comparability.

Service Provider Recognition. Once a Service Provider has enrolled, he/she may be recognized upon return to the website 460. Service Providers may enter an earlier set "password" to ensure service provider identification.

Process Tracking/Update. Upon entry into the web site by an enrolled user, a standard "window" within the web site, whether generic or personalized, may summarily present service provider-specific status information on all active CSRs.

Referred Prospect Profile ("RPP")

As an additional feature, the basic contact information (e.g. business name, contact name, address, telephone, e-mail) is entered by the referring service provider, creating a Referred Prospect Profile. The pieces of this information (e.g. business name) may be used as key words supporting automated searches of online or offline databases to enhance the RPP. Any search results may be imported into the RPP.

Based on the information in the RPP, the commerce facilitator may either (i) launch a pre-formatted, semi-customizable (include name of referring Service Provider) communication via one of multiple mechanisms, including fax, e-mail and/or physical mail delivery (this could be fulfilled through a third-party, so delivery of the pertinent contact information via an electronic method would be required), or (ii) initiate a telemarketing or direct sales effort to the Referred Prospect.

The results of the referral process may be tracked by referring the service provider. Participating service providers may be encouraged to provide referrals by offering certain awards, sweepstakes or other economic consideration.

To either (i) ensure that prospective service providers are qualified to participate in the service or (ii) provide additional information to Consumer users to improve their overall decision-making confidence, referring service providers may be asked to complete a Peer Rating & Review process similar to that completed by consumers.

Pre-Qualification Process

Figure 5:
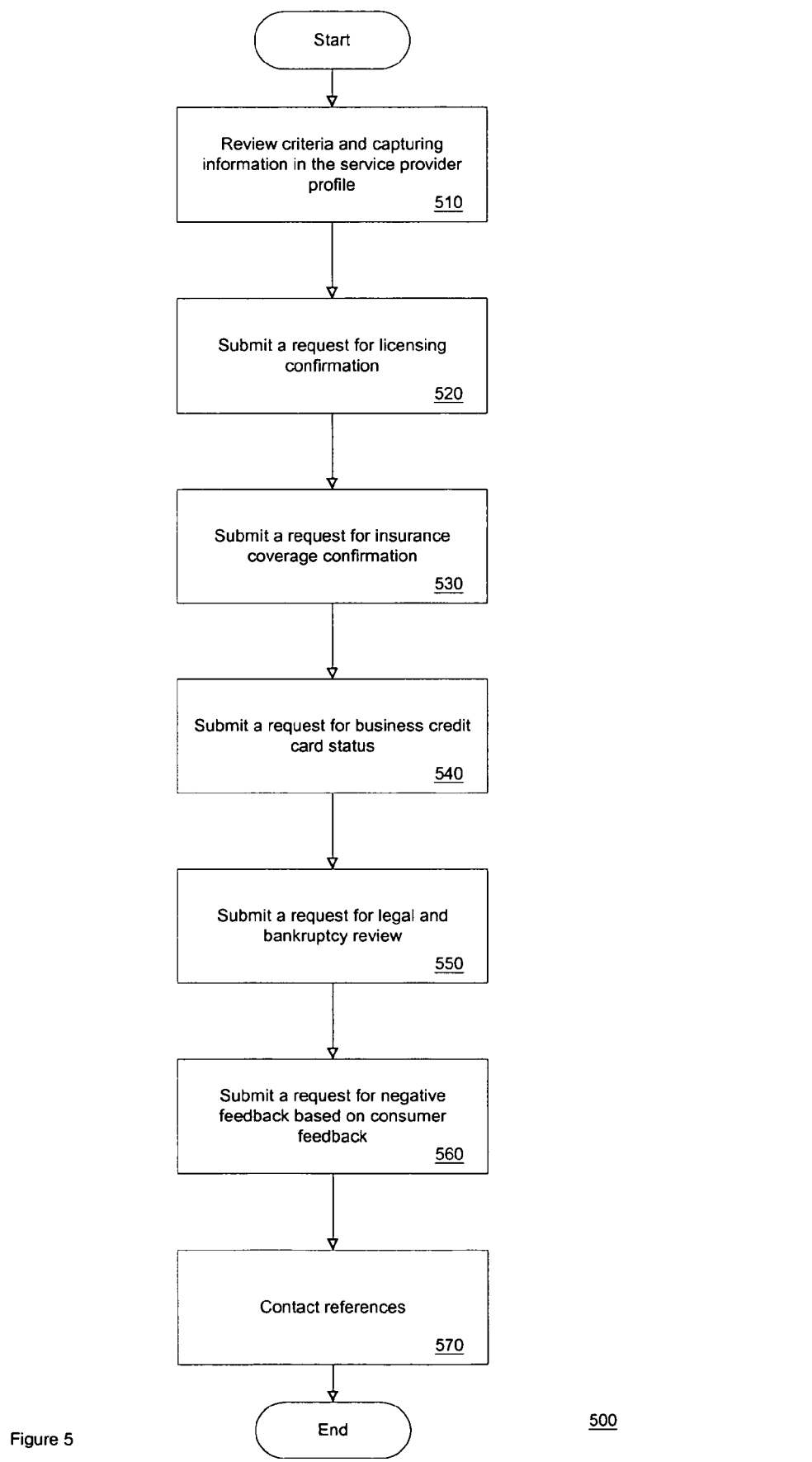
FIG. 5 illustrates a consumer pre-qualification process according to one embodiment of the present invention.

FIG. 5 illustrates a Pre-Qualification Process 500 according to one embodiment of the present invention. Briefly, the Pre-Qualification Process 500 may be executed for each enrolling service provider. It may review certain objective criteria and capture the relevant information in the Service Provider Profile. This process 500 optimally will be automated; however, certain information components may require manual input.

The Pre-Qualification Process 500 begins with reviewing the objective criteria and capturing relevant information in the service provider profile 510. Next, the request to obtain licensing information is submitted to the relevant licensing body 520. Where feasible, the commerce facilitator system automatically submits a request for licensing confirmation to the relevant licensing body, or scan an online database 520. This request will ideally be electronic; however, if the relevant body does not support electronic request, then a pre-formatted (including specific information from the Service Provider Profile) fax may be sent or a manual (telephone) inquiry may be prompted.

Once the licensing information is obtained 520, the system submits a request to obtain information regarding insurance coverage 530. Where feasible, the system automatically submits a request for insurance coverage confirmation to the relevant insurance company indicated through the SPEP and resident in the Service Provider Profile 530. This request will ideally be electronic; however, if the relevant insurance company does not support electronic request, then a pre-formatted (including specific information from the Service Provider Profile) fax may be sent or a manual (telephone) inquiry may be prompted. If the insurance carriers require the confirmation request to be initiated by the service provider, then the service may provide a pre-formatted request for submission by the service provider with reply directly to the Company.

The system then submits a request to obtain business credit status 540. Where feasible, the system may also automatically submit a request for business credit status to one or more third-party agencies based on information resident in the Service Provider Profile 540. This request, and the third-party agency's response, will be electronic. The choice of third-party agency may be driven by industry/service sector (using NAICS, for example), geography, random rotation, etc.

Additionally, the system submits a request to obtain information regarding legal and bankruptcy review 550. Where feasible, the system may automatically submit a request for legal and bankruptcy review to the relevant state's Attorney General's Office based on information resident in the Service Provider Profile 550. This request will ideally be electronic; however, if the relevant Attorney General's Office does not support electronic request, then a pre-formatted (including specific information from the Service Provider Profile) fax may be sent or a manual (telephone) inquiry may be prompted.

Certain agencies, consumer groups and associations capture information on businesses, based on consumer feedback, usually negative. The system will request such negative information from relevant agencies or groups 560. Where feasible, the system may automatically submit a request to the relevant agency or group based on information resident in the Service Provider Profile 560. This request will ideally be electronic; however, if the relevant Group does not support electronic request, then a pre-formatted (including specific information from the Service Provider Profile) fax may be sent or a manual (telephone) inquiry may be prompted.

During the SPEP the prospective service provider participants may be required to submit basic contact information for references (e.g. XX customers from last year of business). These references can then be contacted via e-mail, physical mail or telephone and questioned regarding the performance of the specific service provider, likely utilizing the Rating & Review Process 570.

Consumer Enrollment Process (CEP)

Figure 6:
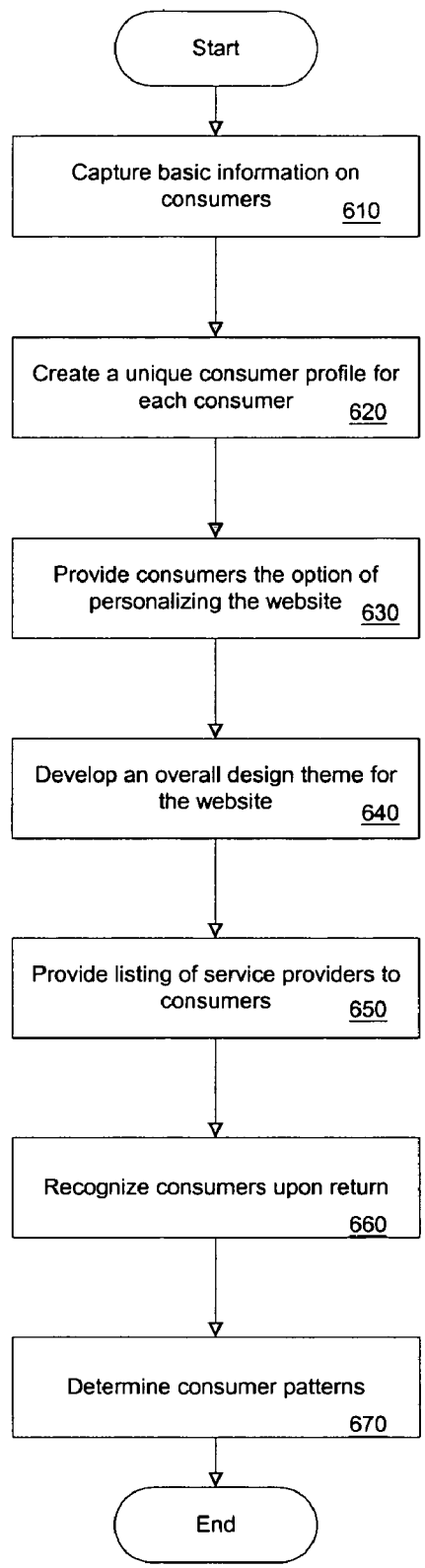
FIG. 6 illustrates a consumer enrollment process according to one embodiment of the present invention.

FIG. 6 illustrates a Consumer Enrollment Process 600 according to one embodiment of the present invention. Either upon "first access" or upon submission of their first service request, the consumer can be prompted to "enroll." The first step of the Enrollment Process 600 involves capturing basic information on consumers 610. Next, the Process 600 creates a unique Consumer Profile for each consumer 620.

Website Personalization. The Process 600 then provides consumers the option of personalizing the website to meet their specific preferences 630. The system then develops an over design theme for the website within the context of metaphorical scheme, such as home 640. The consumers are then provided a complete listing of, but not limited to, participating service providers with searching capability by categories, such as geography, service category and rating score 650.

Consumer Recognition. Once a consumer has enrolled, he/she may be recognized upon return to the website 660. The service may also recognize Consumer geographic origin even before they have enrolled, thereby allowing geo-sensitive content and other features to adjust accordingly.

The Process 600 determines consumer patterns with regard to subject interest and navigation, such that anticipating preferences and presenting content are likely to be of interest to the specific consumer 670.

Process Tracking/Update. Upon entry into the web site by an enrolled user, a standard "window" within the web site home page, whether generic or personalized, may summarily presents status information on all active Consumer-specific CSRs.

Consumer-driven Service Request (CSR) Process. When a consumer desires to submit a service need for quote or referral, they may proceed through the CSR process which, via an intuitive and user-friendly mechanism, describes and defines their service need and packages it in a meaningful way for service providers.

According to one embodiment, the CSR Process provides an intuitive, decision-tree method for developing a detailed description of a consumer's service needs that is meaningful to a service provider. The overall objective is to present service providers with sufficiently descriptive and detailed CSRs so that they can submit a firm quote to the consumer.

The CSR Process may begin with the Consumer indicating an initial "Category" (e.g. plumbing; lawncare; painting; etc.) or, if the user can not identify the appropriate "Category", then the CSR process provides a path that identifies the "Problem/Issue" and leads the user into the appropriate "Category" (e.g. water doesn't work, but electricity is on=Plumbing). The local service economy can generally be segmented into categories that are generally acknowledged and accepted (i.e. Yellow Pages organization and presentment).

The consumer may be presented with a basic listing of service categories, perhaps through a multi-tiered mechanism (e.g. cleaning—to—power washing or house cleaning). If the consumer cannot determine the appropriate service category, the CSR may accept descriptive input on the service need, cross reference a knowledge management database, and present additional questions to guide the consumer into the correct service category. As indicated above, the objective of the CSR Process is to create a detailed description of the service need for presentation to service providers. This description preferably includes measurements, product identifiers, desired solutions, etc.

Interactive Interviews. As the consumer narrows the alternatives that describe the service need, indications or choices by the consumer lead them to a new set of alternatives and choices. Hence, the interactive question and answer interview provides a detailed description of the consumer's service needs.

Measurement Templates. Many service needs are measurable (e.g. square footage for flooring, linear footage for fencing etc.). Consumers will be presented with the appropriate template for the desired service need.

Visual References. Throughout the user's interaction with the CSR, where useful for facilitating the description, the consumer may be presented with visual images (photos;

drawings; etc.) to ease identification and guide the consumer down the appropriate path to a correct service need description.

Commerce Facilitator Platform

As described earlier, the commerce facilitator platform brings together consumers and service providers by matching consumer needs to service providers' capabilities. The commerce facilitator platform facilitates efficient identification of the appropriate and pre-qualified service providers and supports more efficient communications. The commerce facilitator platform also provides a competitive environment, by providing reliable qualitative information about the service providers to the consumers, and by enhancing the consumer-to-service provider communication process such that seeking multiple quotes is convenient.

Figure 7A:
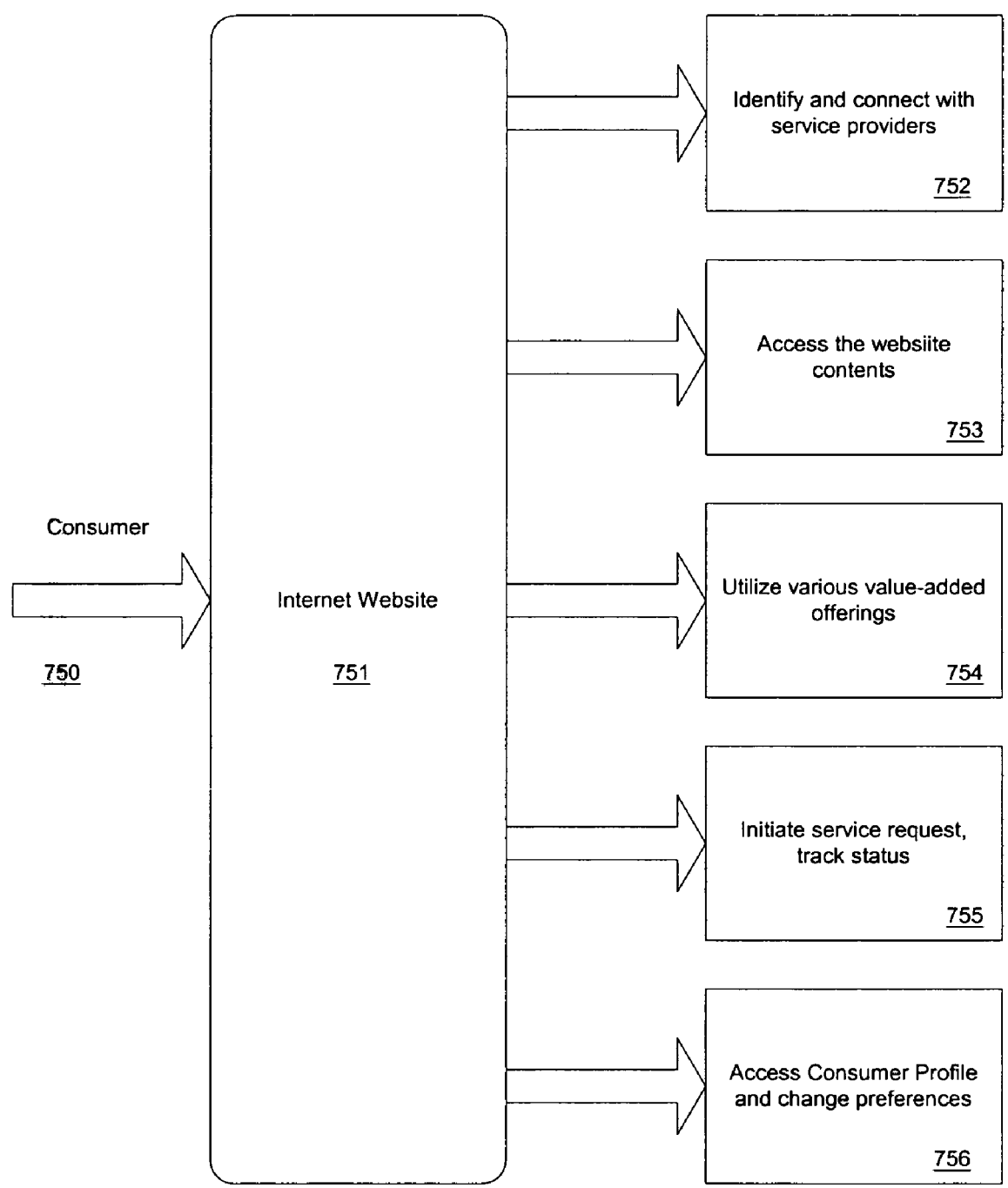
FIG. 7A illustrates exemplary consumer interactions with the commerce facilitator platform according to one embodiment of the present invention.

According to one embodiment, as illustrated in FIG. 7A, a consumer 750 can access the a website associated with the commerce facilitator platform 751 to (1) identify and connect with service providers to fulfill their local service needs 752; (2) access content relevant to these needs 753; (3) utilize various value-added offerings related to their fundamental local service needs 754; (4) after initiation of a service request, track the status of these requests 755; and (5) access their Consumer Profile and change preferences 756. According to this example, consumers can access the commerce facilitator platform through a website supported by generally available browser technology.

The website is designed to be functional, compelling and intuitive, with creative metaphors appropriate for the service being offered. Logical paths will guide the consumer through the services offering. The website may also offer users a variety of relevant and related content, such as service articles, and user generated content through discussion groups.

Figure 7B:
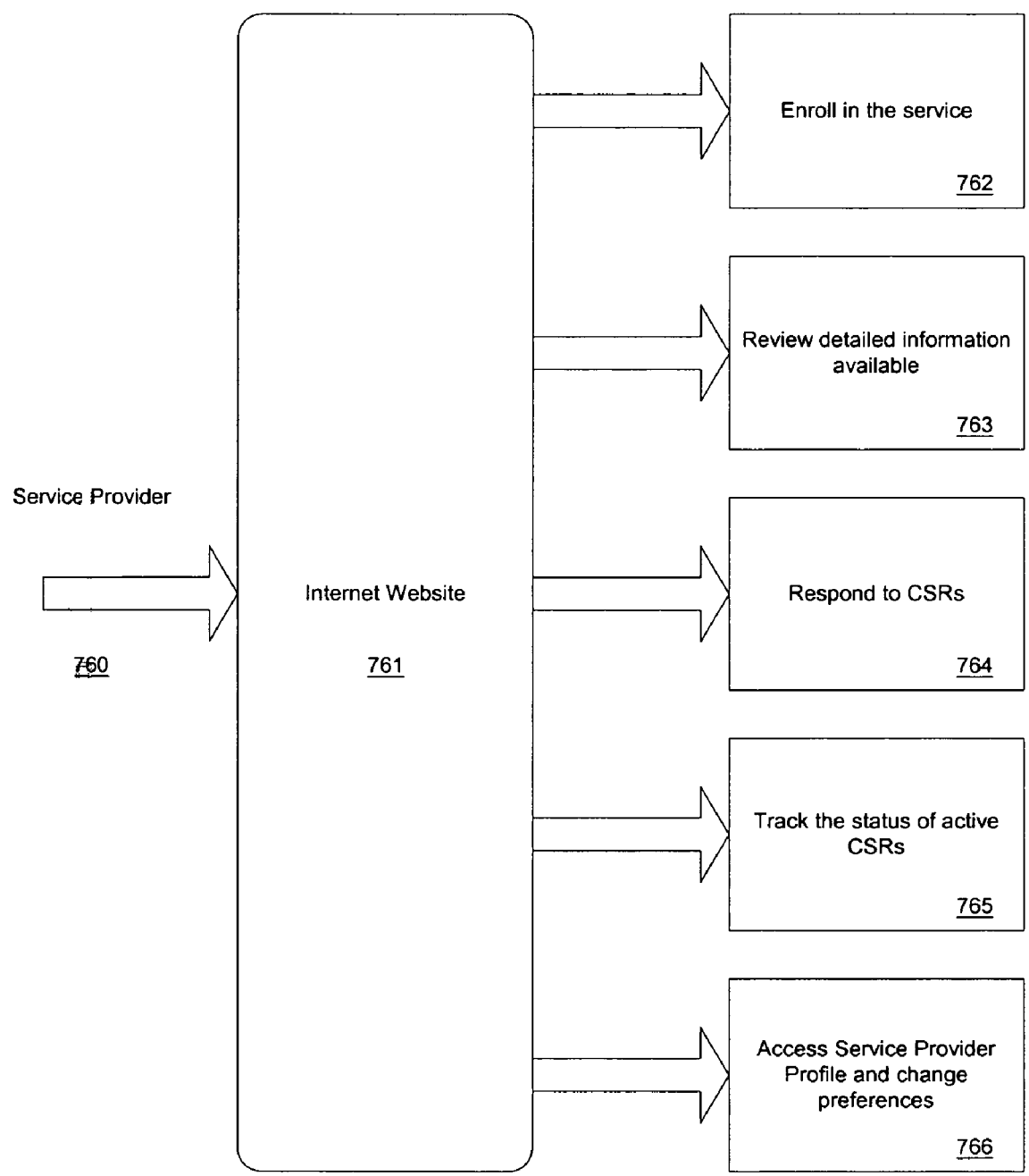
FIG. 7B illustrates exemplary service provider interactions with the commerce facilitator platform according to one embodiment of the present invention.

FIG. 7B illustrates that a service provider 760 can access the website 761 to (1) enroll in the service 762; (2) review detailed information on available CSRs 763; (3) respond to CSRs 764; (4) track the status of active CSRs 765; and (5) access their Service Provider Profile and change preferences 766.

Like the consumers, service providers may access the commerce facilitator platform through a website supported by generally available browser technology. In addition, the service supports an array of offline communications mechanisms, both inbound and outbound, that enables service providers to participate when they are unable to gain online access.

Consumer-to-Service Provider Communications. Various business models are possible. According to one embodiment, the website may be employed during ongoing communications after a Quote or Referral List is delivered. For example, the web site may support ongoing communication, such as service scheduling. In this embodiment, the website home page may summarize pending communication from service providers (this may be in addition to direct e-mail messages sent to the consumer).

Advertising/Promotion Engine. The commerce facilitator platform may also include an engine to deliver advertising, such as banner ads, based on predetermined target specification such as user type, geographic location, subject category, or user demographic profile. In this manner, the website may sell advertising and promotion opportunities based on its attractive and targeted user profiles, including both consumers and service providers.

Security. The commerce facilitator platform and the information maintained in its extensive database, including Consumer and Service Provider Profiles, Rating & Review information, and past Service Transaction information, is preferably maintained in a secure fashion to ensure that there is no capability of tampering or general operational disruption.

Disaster Recovery/Mirroring. Because delivery of the service will be primarily reliant on the commerce facilitator platform, preferably a high level of availability is provided to maintain a basic level of operations. For redundancy and performance reasons, the commerce facilitator platform may need to mirror its website and access to its underlying database engines across multiple hosting sites or geographies.

Performance. Preferably, the commerce facilitator platform meets or exceeds user expectations with regards to response time and accessibility by providing a robust, scalable database solution that will support millions of consumer and service provider users.

Matching Process

Figure 8:
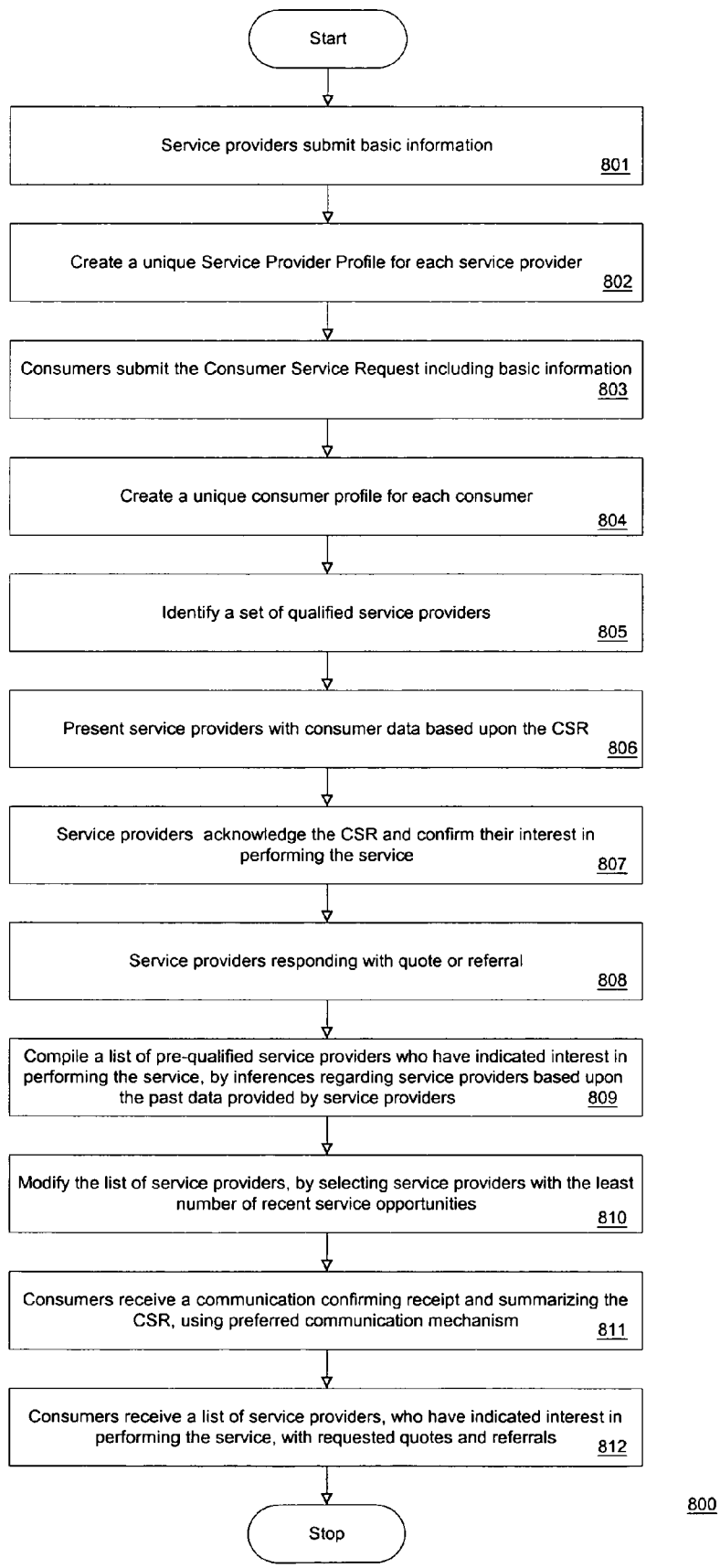
FIG. 8 illustrates a matching process according to one embodiment of the present invention.

FIG. 8 illustrates a Matching Process 800 according to one embodiment of the present invention. The Matching Process 800 may use the information submitted by service providers and consumers 800. The service providers submit information to a database consisting of basic information, such as name, address and years in operation, and some preference information, such as service types, geographic region and communication mechanism 801. Using the information provided, a unique Service Provider Profile is created for each service provider 802.

Screening. Certain information components within the Service Provider Profile and the CSR are used as key matching components.

Once the CSR has been completed, the Consumer "submits" the CSR to the Matching Process 803, or saves it in its current form for adding information later prior to submittal (e.g. a specific measurement is required which mandates that the consumer leave their computer). Additionally, the form may be printed for offline completion. A unique Consumer Profile is created for each consumer, using the CSR information 804.

A completed CSR that is ready for submittal includes one or more of the following (i) a thorough description of the service need or project, (ii) required completion date or time (if within 24 hours), and (iii) certain consumer preferences regarding the number of service provider quotes or referral and forms of communication. Of course, the more detailed the information is in the CSR, the more quotable the service need or project will be for service providers. Therefore, preferably, each of i–iii, above, are completed for each CSR.

Upon completion and submittal of a CSR, the Matching Engine may cross-reference key information components from the CSR, the Consumer Profile, and a corresponding table of key information components gleaned from the Service Provider Profile database to identify a group of eligible service providers for the specific CSR 805.

The service providers are then presented with sufficiently descriptive and detailed consumer-data based upon the CSR 806. Relying on the CSR information, the service providers acknowledge the CSR and confirm their interest in performing the service 807, by responding with quote or referral 808.

The Matching Process 800 then compiles a list of pre-qualified service providers who have shown interest in meeting the consumer's service needs. The screening process may include an Intuitive Predicting Method, where inferences regarding service providers are made based on historical observations, such as the past interactions with service providers 809. For instance, a service provider who is only interested in roofing jobs, as presented by his acceptance of all past such jobs, will be not be recommended for plumbing jobs. The Intuitive Predicting Method may also infer special skills needed by service providers based on the interview information provided by consumers. For instance, if a consumer, seeking plumbing services, is located in a rural area, only those plumbers who have experience with wells be recommended.

Additionally, the Matching Process 800 may modify the list of service providers, by selecting service providers with the least number of recent service opportunities, creating a fair and balance distribution of jobs 810. The Process 800 also encourages service providers to quickly reply when a service is requested, as service providers replying promptly are given priority over others.

The consumers receive a communication from the Commerce Facilitator confirming receipt and summarizing the CSR, using the preferred communication mechanism 811. Additionally, the consumers receive a list of service providers, who have shown willingness to perform the requested service, with requested quotes or referrals 812.

Miscellaneous Service Requirements. The service also provides an area for posting miscellaneous service needs that are not specifically supported by the service, either because they do not as yet logically fall within a given service category or potentially because within that specific geographic region a certain category is not yet supported.

Rating & Review Process/Quality Seal

Figure 9:
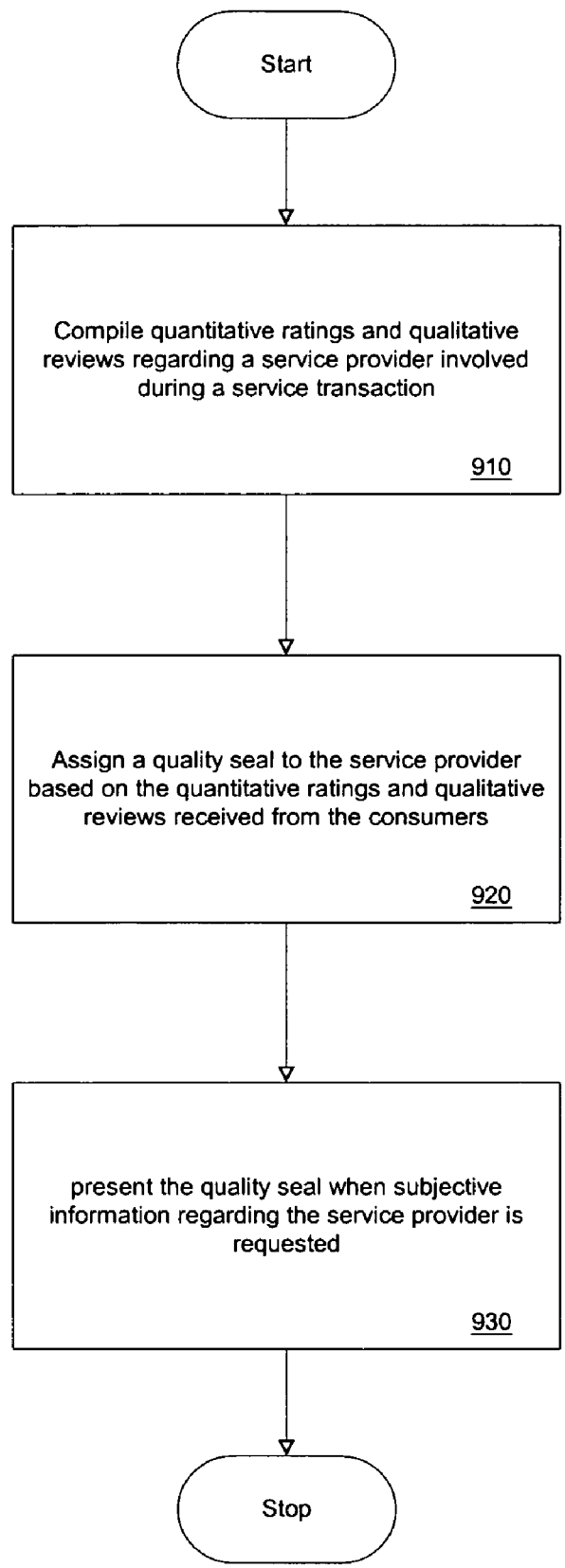
FIG. 9 illustrates a quality seal process according to one embodiment of the present invention.

FIG. 9 illustrates a method of rating and reviewing the service providers using Quality Seal 900. The method includes compiling ratings and reviews regarding the service providers involved during the service transaction 910. Based on the quantitative ratings and qualitative reviews received from the consumers, each service provider is assigned a Quality Seal 920. The Quality Seal, which is updated in real-time, is provided to the consumers as part of the subjective information available to the consumers 930.

The Quality Seal will indicated the overall rating of a service provider using a defined rating system, such as the "star system," where five stars is the highest rating and one star is the lowest, or the "medal system," where gold medal is the highest rating and bronze medal is the lowest.

The consumers are requested to provide the rating information regarding the service providers, so that the Quality Seal can be assigned. For instance, upon completion of a service transaction that has been facilitated by the service, consumers may be asked, via e-mail, for example, to complete the R&R Process for the specific service provider(s) involved in their project.

Quantitative. The consumer will respond to one or more questions regarding the performance of the service provider based on a scale [1–5; A–E; etc.].

Qualitative. The consumer will be provided with an open text box to enter written comments on the Service Provider.

Services & Tools

Figure 10:
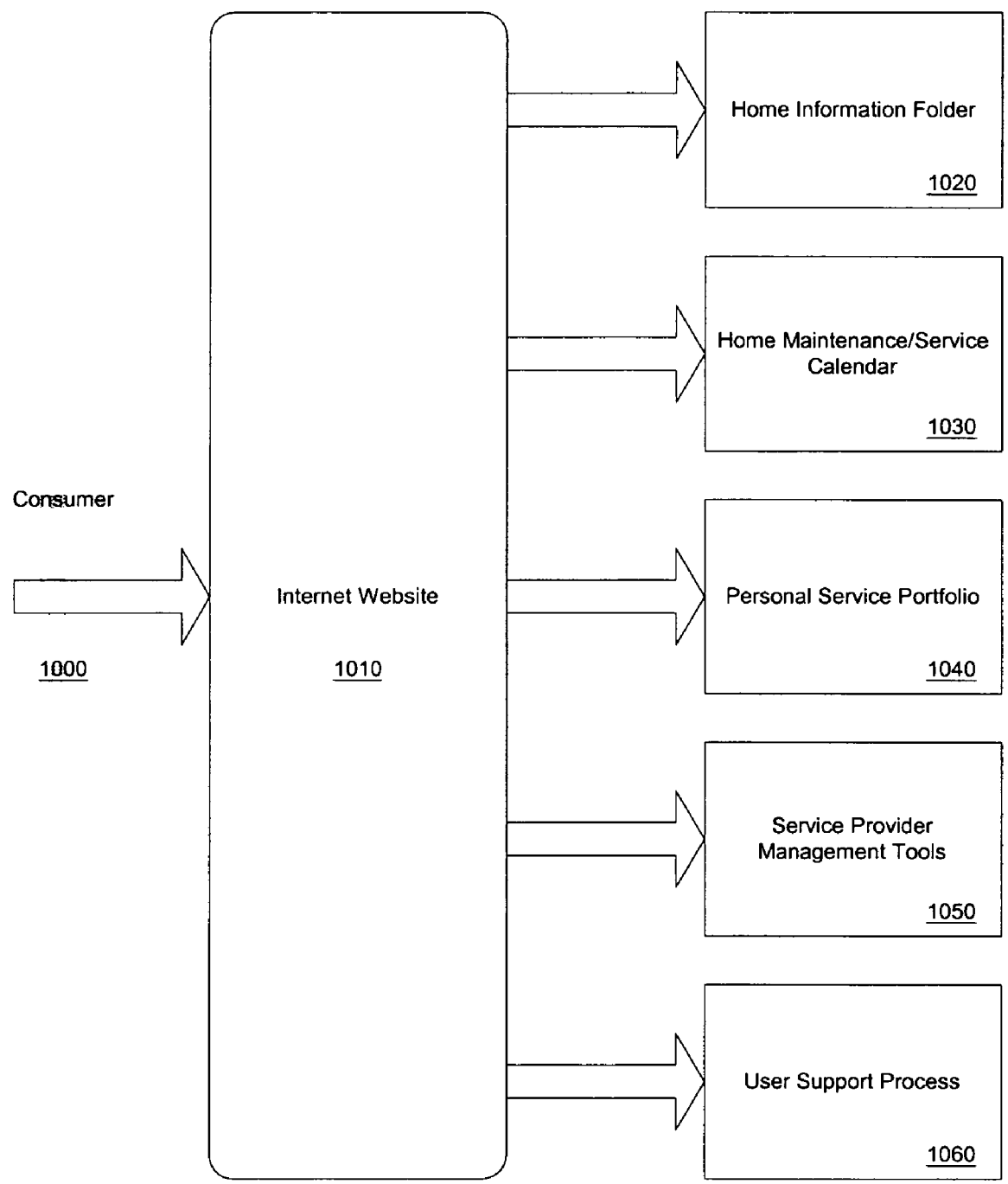
FIG. 10 illustrates services and tools available for consumers' use.

The consumers are provided access to various services and tools. For instance, as shown in FIG. 10, a consumer 1000 may access one or more of the following (1) Home Information Folder 1020; (2) Home Maintenance/Service Calendar 1030; (3) Personal Service Portfolio 1040; (4) Service Provider Management Tools 1050; and (5) User Support Process 1060. A brief description of these services and tools will now be provided:

Home Information Folder

Home Specifications. This area may provide pre-formatted inputs for home specifications that can be proactively populated by the user, automatically populated by the commerce facilitator over time via information collected via the CSR process, or potentially imported via other information sources (e.g. MLS listing of recently sold home). Once entered, the information can be imported into future CSRs.

Past Services. The user can access the repository of their past service transactions (potentially including those purchased or performed via the prior owner=tracking by home site) and sort based on different filters (e.g. date of service; service cost; service category). For rental property owners, this feature will enable tracking of service by property within their portfolio.

Content File. Users may also have the ability to "save" content of interest for future reference (e.g. "10 Easy Repairs to Make Your Home Saleable").

Home Maintenance/Service Calendar The Calendar, which will be specific to each enrolled user, will enable consumers to schedule future reminders or reference potential service events.

Pre-Loaded. Based on user information from the Consumer Profile (e.g. geography; home type; home age; etc.) or from the Home Specifications file (e.g. forced air heat; gravel driveway; etc.) certain events, reminders or suggestions may be pre-logged into the Calendar (e.g. Nov. in Northern cities=furnace servicing; April in FL=air conditioning servicing; etc.).

User Scheduled. The user also has the ability to add events and reminders to the calendar. These can be activated to launch e-mail reminders based on a prescribed notification time.

Past Services Driven. Certain events or reminders might be added based on past service transactions and industry accepted or recommended intervals (e.g. pest control every XX mos.; driveway resurfacing in Midwest every X years; etc.).

Personal Service Portfolio Depending on the range of local service economy sectors addressed by the service, users may want to categorize frequently used services, particularly if the service offers additional direct communications facilitation and scheduling (e.g. need to schedule pick-up by regular dry cleaner; onsite oil change service; etc.).

Service Provider Management Tools A variety of analysis tools may be provided to help the service provider better understand and manage their business.

Service Type Analysis. The service provider can access historical information on their service transactions, CSRs that were not consummated; blind profiles of other service providers from similar geography or service category and their performance, all of which could be presented to provide a better understanding of past performance and future opportunity.

Performance. Based on their ratings and reviews to date, the service may offer suggestions on ways to improve their performance and their ratings.

User Support Process

While the service is designed to be intuitive, there will necessarily be times when users, both consumers and service providers, need additional information, explanation and/or help. Additionally, certain circumstances may require intervention on behalf of a user to facilitate resolution of an issue, misunderstanding or dispute. Therefore, the commerce facilitator may provide a variety of mechanisms for users to access information or activate support.

1. Information Mechanisms. The web site may be designed from a navigation and user interface standpoint to provide the appropriate information at the appropriate place and time.

a) FAQs. The service may provide answers to a predictable list of questions (this list will evolve based on actual user feedback).

b) Anticipatory Guidance. The web site may anticipate potential user information needs based on site map location (this information will evolve based on actual user activity and feedback).

2. Support Mechanisms. The service offers users several alternative mechanisms for accessing customer support. Preferably, there will be a tiered offering of support alternatives that attempts to answer questions and resolve issues via the most efficient, user-friendly and economical means first, with a logical escalation driven by the complexity of the issue.

a) Subject Sensitive "Help". The user can "ask for help" based on where they are is in the web site or underlying process.

b) E-mail. Users can submit questions or issues via e-mail and expect short-turnaround response.

c) Online Chat. Real-time support from a live operator may be provided via online chat (ICQ-like) technologies.

d) Newsgroups/Discussion. Users can share information regarding use of the system and post/reply specific questions.

e) Telephone—Live Operator. For the most complex issues and questions, the Company will provide access to a live operator via telephone.

Activity/Information Tracking. As users utilize different information and support mechanisms, the Platform will track their paths to determine common user issues that can be solved in future versions or enhancements.

Functional and Technical Overview

Figure 11:
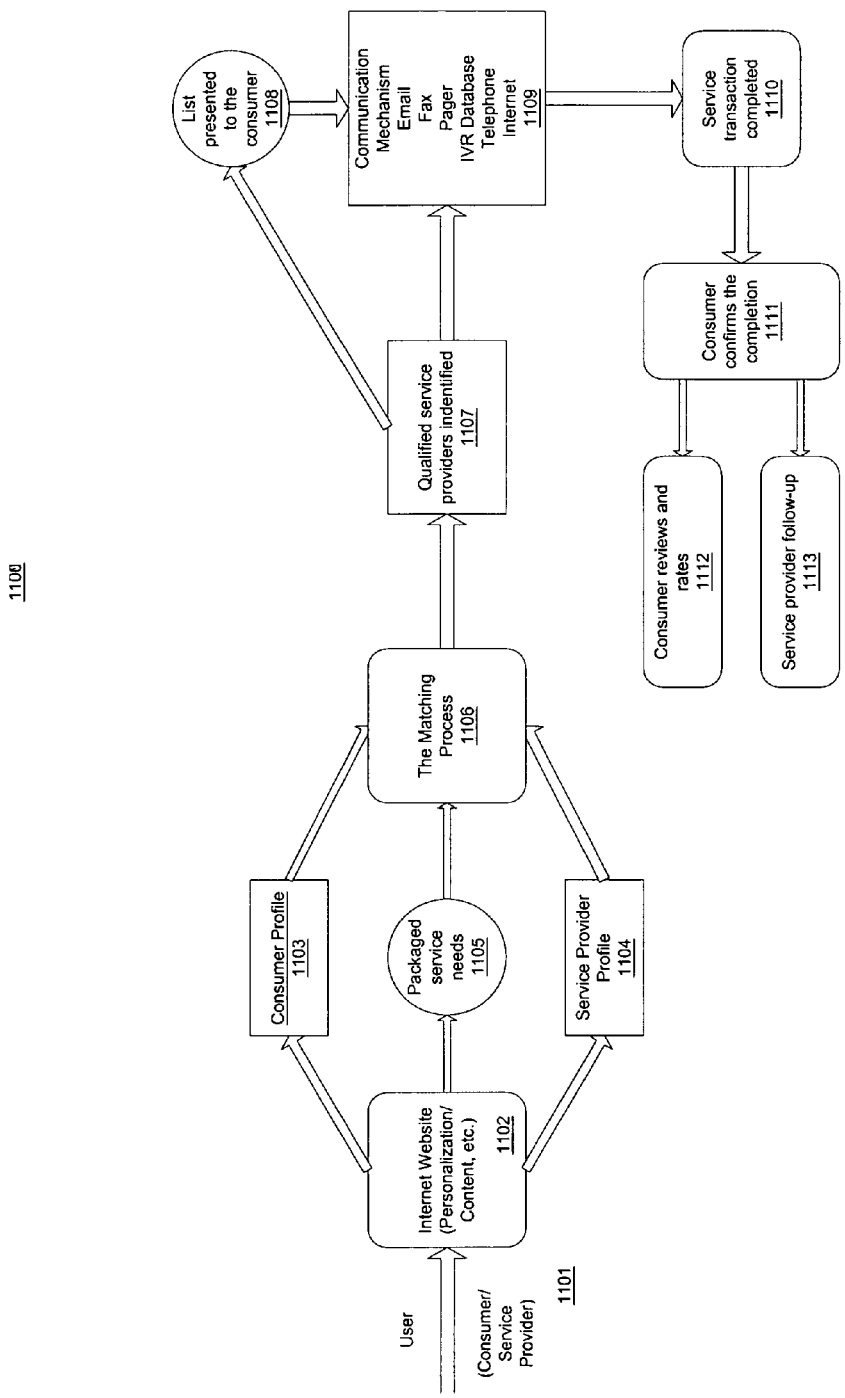
FIG. 11 is a block diagram illustrating interactions among various components/processes according to one embodiment of the present invention.

FIG. 11 is a block diagram illustrating interactions among various components/processes of the system 1100 according to one embodiment of the present invention. According to one embodiment, the website 1102 supports, and is optimized for, generally available browser technology, such as Microsoft Internet Explorer and Netscape Navigator. Additionally, it may be desirable to optimize a version of the web application for use via high bandwidth internet service and/or for delivery via other web appliances (e.g. PDAs; etc.)—these may be used for all or a subset of the service functionality (e.g. service provider status review; initial response; etc.).

The user interface may be used to develop an overall design theme for the website 1102 within the context of a metaphorical scheme (e.g. home, etc.). The website 1102 will provide users with an intuitive, user-friendly navigation methodology that facilitates exploration or quick access to desired functionality depending on user preference.

As mentioned above, once a user 1101 has enrolled in the service, they are recognized upon return to the site (e.g., by name; geographic news/content; etc.). Additionally, the website 1102 may, over time, determine user patterns with regards to subject interest and navigation such that the website anticipates preferences and presents content likely to be of interest to the specific user.

Enrolled users 1101 will have the option to "personalize" the web site home page to meet their specific preferences (e.g. content subjects; use of value-added components; CSR history tables; etc.).

According to one embodiment, a Consumer Enrollment Process (CEP) captures basic information on the consumer, including:

| | |
|---|---|
| Name (First, Last, Middle) | Home Owner/Renter |
| Address, City, State, Zip | Home Description (from |
| Telephone (Day, Evening) | Choice List - check box) |
| E-mail Address | Home Value |
| Marital Status | How Long in Home (pull |
| No. Children | down) |
| Unique Identifier | Home Age |
| Other Demographics (income; employment type; etc.) | Service Interests (from Choice List - check box) |
| Anticipated Service Needs | Rental Property Owner (Y/N) |
| | No. Properties |
| | Properties Type (# units) |
| | Same/Different Geography |

A unique Consumer Profile 1103 is created using basic and preference information provided by the consumer. Certain basic information may be required for enrollment while other pieces may be optional. In the event that the enrollment form is completed incorrectly, the consumer is prompted to complete it correctly without having to re-enter all the information (i.e., a returned form will not be erased when re-presented to the enrolling consumer). The enrollment process may support multiple property locations for a single consumer user to accommodate second- or vacation-homes and/or multiple rental properties.

Augmented information regarding consumers for the Consumer Profile 1103 may be acquired from third-party services to provide demographic information on enrolled consumers to augment the Consumer Profile 1103. For example, some component of the basic information may be delivered to the third-party service (e.g. address) to drive the demographic information retrieval process. In this manner, one or more files of information may be received from the third-party service with the enhanced demographics, which can then be incorporated into the Consumer Profile 1103.

Additional consumer preferences may be established upon enrollment. Consumers can change these preferences from time to time by accessing their Consumer Profile 1103.

After a service provider has decided to enroll in the service they are directed to the Service Provider Enrollment Process (SPEP). The SPEP preferably captures basic information on the service provider, including:

| | |
|---|---|
| Business Name | Insurance Carrier |
| Address, City, State, Zip | Insurance Coverages |
| Telephone (Day, Evening) | Service Interests (from Choice |
| E-mail Address | List - check box) |
| Contact/Owner Name (First, Last, Middle) | Licensing Information Activate/De-Activate Status |
| Years in Operation | Credit Information (e.g. Bank; |
| Annual Revenues | Industry references) |
| No. Employees | Referring Member |
| Unique Identifier | |

In addition, to support the most effective the Matching Process, the commerce facilitator system will collect additional preference information from each service providers, such as service types, geographic region of operation, service response and fulfillment time, preferred communication mechanism, etc. A unique Service Provider Profile 1104 is created using basic and preference information provided by the service provider.

With regard to service type, service providers may indicate the types of service transactions for which they would like to be considered. The preference input process preferably recognizes a discontinuity of types of service transactions (e.g. dry cleaning and plumbing) and may limit the absolute number of category types.

The service provider will indicate the type of CSRs they are interested in seeing such as Quote versus Referral and requested Response or Fulfillment Time (e.g. emergency/quick turn-around; long-lead time; no constraints; etc.).

Service providers may indicate their preferred communication mechanism and have the ability to change these Preferences at any time by accessing their Profile.

During the SPEP, the enrolling service provider may be encouraged to identify potential Service Provider participants that can be contacted regarding the service ("Referred Prospects"). This process preferably captures enough information to enable a communication to be launched to the Referred Prospect. The commerce facilitator system may also track these referral leads to determine conversion and enrollment rates and to note such in the referring Service Provider's Profile. This information may drive economic remittance or "chits" for a contest or sweepstakes.

Post-Matching Process Communication

Upon completion of the Matching Process, a set of qualified service providers is identified 1107 that are eligible to quote or be referred to the consumer. These service providers typically acknowledge their interest and/or formally respond to the CSR; such response form and mechanism may vary depending on the nature of the CSR.

In the event where the CSR is sufficiently descriptive and detailed so that the service provider can submit a formal quote based solely on that information, the service, assuming that the consumer has indicated a preference for a quote, (i) indicates that a quote is preferred and (ii) provides a templated form for the quote that is specific to the CSR (e.g. appropriate units (sq. footage), included products, etc.).

A qualified service provider who indicates an interest in being referred may also want to provide supplemental information for the consumer. This could include a simple link to their web site or a detailed review of past service fulfillment specifically related to the CSR at hand.

Analysis may then be performed on the submitted responses, ensuring that all required information is included and service providers may be prompted to add information where missing.

The service may compare all submitted quotes for a specific CSR and identify significant outliers (High or Low) relative to (i) other submitted quotes for that CSR and (ii) historical CSRs identified as being very similar in nature. Based on identifying a potential mistake. In this manner, the service may notify the submitting Service Provider of the issues and prompt for correction.

CSR Response Presentation to Consumer

Upon completion of the Service Provider Response Process, the consumer is presented with the results 1108. The listing of qualified Service Providers 1107 eligible for referral for a specific CSR is be presented to the consumer. The consumer sees a summary of the eligible Service Providers, including, for example, name, Quality Seal, etc.

The consumer may then request more detailed information on specific service providers by for example viewing full Quality Seal, pre-qualification information, etc., and potentially linking to the service provider's web site.

In the event that the CSR was sufficiently detailed for service providers to provide an online quote, then the consumer is presented with the submitted quotes. According to one embodiment, the quotes are presented in a format that provides for easy comparison, for example, difference or similarities may be highlighted in some manner to bring them to the attention of the consumer.

The consumer may also be provided with the ability to sort the presentation order based on different variables, including composite rating, cost, Service Provider location, etc.

The consumer may also have the ability to indicate communication preferences with regards to a specific CSR, including who they would like to communicate with and how: who will initiate communication (consumer or service provider), the mechanism (e-mail; telephone; etc.), when they want to be communicated with, etc. More specifically, in the event that quotes have been submitted, the consumer may be prompted to indicate which service provider they intend to move forward with, potentially ranking their preference if there is any question as to actually consummating a service transaction 1110 (e.g. the consumer may wish to actually communicate with the chosen Service Provider before finalizing a decision).

Consumer Follow-Up Process

Upon completion of a service transaction 1110, the consumers are requested to confirm the service transaction 1111, and provide a rating and review feedback 1112.

Service Completion Confirmation. Since a company implementing the service described herein, may base its business model on commissions collected from service providers, in general, it is desirable to be able to confirm whether a submitted CSR has led to a service transaction between consumer and service provider 1111. The consumers are requested to confirm the service transaction 1111 at time they provide consumer feedback 1112.

Service Transaction Confirmation. The communication to the Consumer may include a summary description of the original CSR and a Y/N indicator to ensure that the CSR is the correct one.

Date of Service. The Consumer is prompted to enter the date the Service Transaction was completed.

Service Provider. From a list of Service Providers who submitted Quotes or were Referred to the Consumer via the CSR Matching Process, the Consumer may be asked to identify the ultimate Service Provider who completed the Service Transaction.

Service Cost. The Consumer will be prompted to enter the total cost (price paid to the Service Provider) of the Service Transaction (and potentially other related information such as method of payment, parts vs. labor, financed, etc.).

Rating & Review Process & Consumer Feedback Upon completion of a service transaction facilitated by the service, consumers may be asked to complete the R&R Process 11123 for the specific service provider(s) involved.

Rating. Several questions regarding service provider performance may be posed to the consumer requiring a "quantitative" answer (e.g. on a scale of 1 to 5, . . . ). These quantitative ratings can subsequently be presented to consumers as part of the subjective information available to support an educated service provider decision. As described above, the rating information may also serve as a component for the Matching Process 1106 by combining the individual scores, potentially with a weighting scheme, to create a composite score.

Review. Consumers may also be provided with space to input a written qualitative review of the service provider's performance. As above, this qualitative review can be presented to consumers as subjective information.

Service Provider Follow-Up Process

If the consumer has confirmed completion of a service transaction based on a CSR, then follow-up may be initiated with the appropriate service provider 1113, as indicated by the consumer. In the event that the consumer has not confirmed consummation of service transaction, then based on time rules, the Follow-Up Process may be initiated with all of the quoting or referred service providers for a specific CSR 1113.

Communication. Based on preferences established by the service provider, the commerce facilitator platform may send a communication, either via e-mail or fax, to initiate the Follow-Up Process. The frequency of this communication may be controlled (e.g., multiple Follow-Ups may be grouped and sent on a periodic basis versus individually forwarded more frequently). Communication may also be bundled with certain billing notification related to fees due from the service provider to the company.

Service Completion Confirmation

Project Confirmation. If the consumer has already confirmed consummation of the service transaction, then the service provider will be asked to also confirm. If the consumer has not confirmed, then the communication to the service provider will include a summary description of the CSR and a request for information regarding any subsequent communication with the consumer, including confirmation of a service transaction.

Date of Service. The service provider will be prompted to confirm the date the service was completed, as indicated by the consumer. If the consumer has not specified the Date of Service, then the service provider will be prompted to enter this information.

Service Cost. The service provider will be prompted to confirm the Service Cost indicated by the consumer. If the consumer has not specified the Service Cost, then the service provider will be prompted to enter this information.

Service Feedback. Service providers may be prompted to rate their experience with the service for a specific service transaction. An input form is presented that proposes several quantitative questions and openly requests qualitative feedback.

Fraud Indicators. If the company's business model is ultimately based on collecting a commission from service providers on completed service transactions, then the company will want to ensure that it can accurately track consumer-service Provider transactions.

Confirmation. The commerce facilitator platform will "flag" situations where a CSR has received sufficient interest and even online quotes, but where neither the consumer nor the service provider has, upon Follow-Up, confirmed consummating a service transaction.

Service Cost. In the event where the consumer and/or the service provider have confirmed consummating a service transaction, the commerce facilitator platform may assess the probability of accuracy of the indicated Service Cost. For example, the commerce facilitator platform may compare the indicated Service Cost against (i) the range of quotes and/or (ii) a historical benchmark established by the service based on similar service provisions.

Alternative Communications Mechanisms

The service may also support various alternative communication mechanisms 1110, besides the Internet, for communicating with participating consumers and service Providers regarding the status of CSRs. Some of the alternative communication mechanisms are described as follows:

Online Communication.

E-mail may be utilized to confirm user actions, notify of status, and solicit feedback and confirmation related to specific CSRs. A web site status box may be accessed from within the web site, this summarizes CSR status and enables related communications and actions; recognized users may be notified that a "status" awaits them. ICQ/Live Chat may be utilized as user support communication mechanism.

Offline Communication.

Pager may be utilized to notify the service provider of a CSR via pager message; depending on pager functionality, the service provider may be able to initiate initial response (Y/N) via the pager.

Automated Telephone may be used to notify the service provider of a CSR via an automated telephone call which may deliver a computer generated or voice recorded summary message and enable initial (Y/N) response.

IVR Database may serve as a source for service providers to check the status of their CSRs by accessing an IVR database; may include detailed information on an available CSR or information on CSR that is "in process"; will support response (Y/N) through the IVR mechanism.

Fax may also be used as an alternative to e-mail for delivering detailed information on an Available CSR; automated distribution; additionally, the commerce facilitator supports detailed response submission via fax with entry into the process either by manual operator or scan technology.

Finally, telephone/live operators may be utilized as user support communication mechanism.

Appendices

Step-by-step screen shots illustrating exemplary end-to-end communications between consumers and service providers according to one embodiment of the present invention are attached hereto as Appendix A.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Appendix A

ServiceMagic.com Service Request Experience
2. A previously registered consumer logs in using their email and password.
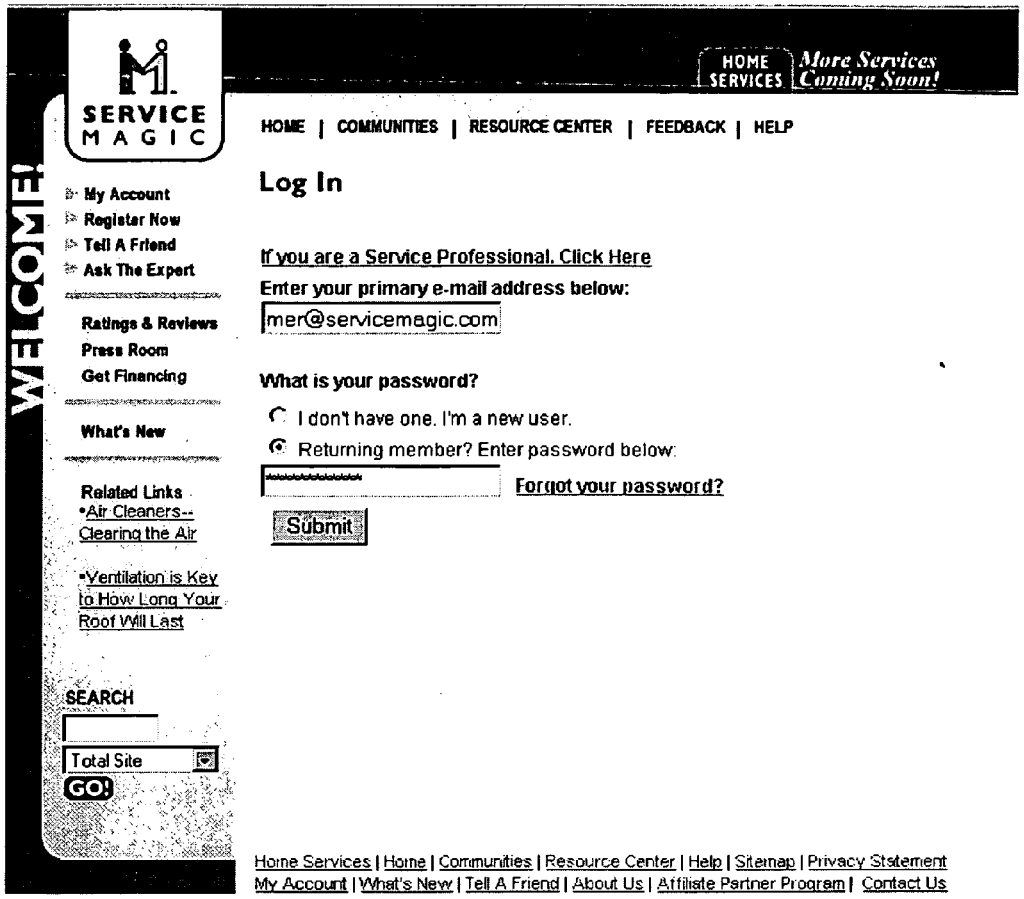

ServiceMagic.com Service Request Experience

3. The Consumer is presented with their home page and clicks on "START a new home project!"

ServiceMagic.com Service Request Experience

4. Consumer selects the category and zip code.

Home Services

ServiceMagic will match you to the right service professional who is reliable and ready to go to work for you!

Our member professionals are individually screened for:
- Required licensing
- Clear bankruptcy background
- Clean legal history

1. Home Services

[Remodels & Home Additions ▼]

Or Use the Key Word Search

2. ZIP code

[09990] [GO]

(This allows ServiceMagic to match you to service professionals in your neighborhood.)

Articles From the Resource Center
- Basic Bathroom Remodeling Tips
- Permits and Licenses Sidebar navigation:
- My Account
- Tell A Friend
- Ask The Expert
- Ratings & Reviews
- Press Room
- Get Financing
- What's New
- Related Links
  - Air Cleaners-- Clearing the Air
  - Surge Protectors SEARCH
[Total Site ▼]
[GO]

ServiceMagic.com Service Request Experience

5. Consumer selects the next level of detail.

Remodels & Home Additions

Select one from the list below.

- ○ Architects, Designers, & Engineers
- ○ Cabinets & Countertops
- ○ Disability Services
- ○ Drywall & Plaster
- ○ Electrical
- ○ Flooring
- ○ General Contractors
- ○ Glass & Mirrors
- ○ Heating & Cooling
- ○ Home Additions
- ○ Home Entertainment System
- ○ Home Security
- ○ Other Small Remodel and Home Addition Jobs
- ○ Painting/Staining
- ○ Plumbing
- ⦿ Remodels by room

[<Back] [Next>]

Articles From the Resource Center
- Some Ideas On Bathroom Upgrades
- Permits and Licenses ServiceMagic.com Service Request Experience 6. Consumer selects the next level of detail.

Remodels by room

Select a type of remodel.
- ○ General remodel
- ○ Kitchen
- ⊙ Bathroom
- ○ Basement
- ○ Enclosures (patio, porch)
- ○ Garage conversion
- ○ Other

[< Back]  [Next >]

ServiceMagic.com Service Request Experience

7. The Consumer answers the interview questions.

Remodel a Bathroom

Answer the brief questions below to find the right professional for your project. None of the responses are required, but the more information you provide, the better ServiceMagic can do its job of finding the right match.

Name your project: Remodel a Bathroom

Please select residence: 25 Demo Lane Consumer Suite Golden, CO

[New Residence]

•Feature article: Bathroom Remodel    •Need help answering these questions?

1. What type of design preparation has been done for the remodel project? (Select all that apply)

☑ Cut outs or photos
☑ Sketches
☐ Architect's drawings
☐ Permits pulled
☐ Other (specify in additional details box below)

ServiceMagic.com Service Request Experience

2. What function will the bathroom serve?
- ⦿ Master bath
- ○ Children's bath
- ○ Family bath
- ○ Guest bath
- ○ Powder room
- ○ Other (describe in additional details box below)
- ○ Don't know 3. What is the square footage of the area to be remodeled?
[40]

4. What is needed for your remodel project?
- ☑ Flooring
- ☑ Cabinetry/Countertops
- ☑ Plumbing
- ☑ Electrical
- ☐ Heating/Cooling
- ☐ Appliances
- ☐ Windows/Doors
- ☑ Painting/Staining
- ☐ Wall removal/building
- ☐ Other (specify in additional details box below)

5. What quality level do you want for your remodel project?
- ○ Economy
- ○ Mid-range
- ⦿ Luxury
- ○ Don't know

ServiceMagic.com Service Request Experience

6. Describe any additional details.

```
I would like my antique tub to be the
focal point of the bathroom
```

Continue

Articles From the Resource Center

- Some Ideas On Bathroom Upgrades
- Why Financial Background Checks Are Important Home Services | Home | Communities | Resource Center | Help | Sitemap | Privacy Statement
My Account | What's New | Tell A Friend | About Us | Affiliate Partner Program | Contact Us ServiceMagic.com Service Request Experience
8. The Consumer answers more information about the Service Request.

ServiceMagic.com Service Request Experience

Project Attributes

Does project require work on a historical structure?  No

Is project covered by insurance claim?  No

Is this service required for the closing of a home sale?*  No

Residence Selection

Please Select Residence for this project   25 Demo Lane Consumer Suite Golden, CO

[New Residence]

[Continue]

Home Services | Home | Communities | Resource Center | Help | Sitemap | Privacy Statement
My Account | What's New | Tell A Friend | About Us | Affiliate Partner Program | Contact Us ServiceMagic.com Service Request Experience
9. The Consumer is given the option if they would like a Confirmed Match or a Suggested Match. In this example, the consumer selected Confirmed Match.

ServiceMagic.com Service Request Experience

10. The Consumer is give a summary of the Service Request information and asked if they are serious about submitting the Service Request.

Service Request Identification
| | |
|---|---|
| ServiceMagic Description | Remodel a Bathroom |
| Your Description | Remodel a Bathroom |

Service Request Description
| | |
|---|---|
| Completed preparations | Cut outs or photos Sketches |
| Bathroom function | Master bath |
| Square footage | 40 |
| What is needed for basement project | Flooring Cabinetry/Countertops Plumbing Electrical Painting/Staining |
| Quality level | Luxury |
| Special requirements | I would like my antique tub to be the focal point of the bathroom |

Property Profile and Matching Information
| | |
|---|---|
| Residence | Golden, CO 09990 |
| Home Age | 6 - 10 Years |
| Home Size | 2,000 - 2,999 sq.ft. |
| Home Owner | Y |
| Property Type | Primary Home |
| Estimated Job Size | $5,001 - $10,000 |
| Preferred Start Date | 5 - 6 weeks |
| Historical Work | No |
| Covered by Insurance | No |
| Required for a Home Closing | No |

By submitting this service request, I agree that:

- I will return calls to ServiceMagic professionals within 48 hours..
- I will meet with ServiceMagic professionals to begin my project.
- I will inform ServiceMagic if I cancel or postpone my project.
- I will complete a brief ratings survey for the service professional that finished my project.

ServiceMagic.com Service Request Experience

By saving this s rvice request:

- I can return to the site, submit this request and ServiceMagic will look for a Service Professional match on my behalf.

 Return to home

Articles From the Resource Center
- Architects and Designers
- Vacation Home Security Tips Home Services | Home | Communities | Resource Center | Help | Sitemap | Privacy Statement
My Account | What's New | Tell A Friend | About Us | Affiliate Partner Program | Contact Us ServiceMagic.com Service Request Experience 11. The Consumer is given a confirmation page that the job has been submitted giving them a ServiceMagic Number (7904).

Request Submitted

Thank you! Service Request Submitted!

Here's what happens next:

1. The ServiceMagic Matching Engine does the work for you

We use your service request to match ServiceMagic Professionals in your area to your job. Our goal is to find three companies that can start your project when you want.

2. ServiceMagic notifies you within 24 hours

We will e-mail you when we have found up to three ServiceMagic Professionals who want to bid on your project. If three are not available, for whatever reason, we will find more search options for you.

3. Select your ServiceMagic Professional

Log back on to our web site and read consumer ratings for the three ServiceMagic Professionals presented to you. You can even find quotes about their work, and link to their web sites. Then pick the best match for your project.

ServiceMagic.com Service Request Experience

| Total Site | |
|---|---|
| GO! | |

Service Request Identification
ServiceMagic #      7904
ServiceMagic Description      Remodel a Bathroom
Your Description      Remodel a Bathroom

Service Request Description
Completed preparations      Cut outs or photos Sketches
Bathroom function      Master bath
Square footage      40
What is needed for basement project      Flooring Cabinetry/Countertops Plumbing Electrical Painting/Staining Quality level      Luxury
Special requirements      I would like my antique tub to be the focal point of the bathroom

Property Profile and Matching Information
Residence      Golden, CO 09990
Home Age      6 - 10 Years
Home Size      2,000 - 2,999 sq.ft.
Home Owner      Y
Property Type      Primary Home
Customer's Estimated Job Size      $5,001 - $10,000
Budget      Flexible
Customer's Preferred Start Date      5 - 6 weeks
Timing      Flexible
Covered by Insurance      No
Required for a Home Closing      No
Historical Work      No
Comments

Contact Information
Contact
Phone      (303) 999-9999
Business
FAX
E-mail      democonsumer@servicemagic.com Return to Home ServiceMagic.com Service Request Experience 12. The Consumer is given a Thank You for Submitting Service Request email immediately after submitting Service Request.

> Hi TEST Demo,
>
> Thank you very much for submitting your Service Request. We hope that you were able to learn some valuable information about your project as you completed the ServiceMagic interview.
>
> Job Number: 7904
> Description: Remodel a Bathroom
>
> Within the next 24 hours (excluding weekends), you can expect to hear from us with the results of your match. We'll invite you back to the website to research the service professionals and choose the right company for your project.
>
> We appreciate that you chose to be part of ServiceMagic's Consumer Community, and we hope you'll visit us regularly. We'll be adding new categories of service as our network of member service professionals grows across the country. So check us out! We look forward to connecting you with more and more local services.
>
> Thanks for being a member of the ServiceMagic Community!
>
> Regards,
>
> Blake Quinn
> Director of Customer Service
> (Toll-Free) (877) 699-4736
> customerservice@ServiceMagic.com

13. What is happening behind the scenes after the consumer presses submit now is as follows:
    a. The ServiceMagic matching engine runs and matches Service Professionals to the task.
    b. Service Professionals are notified that they can bid on the job.
    c. Service Professionals Accept or Reject the job.
    d. The consumer is presented with the Service Professionals who accepted the job.

This example will show b-d. The Matching Engine process is an internal process that can not be demonstrated via screen shots.

ServiceMagic.com Service Request Experience

14. The Service Professionals are notified of the job via Fax, Email, Phone or Pager. The following is an example of an email sent to one of the Service Professionals.

---

Hi Fred Lyman,

ServiceMagic.com (formerly Wisen.com) has received a Service Request that matches the work preferences you provided us. YOU MUST RESPOND TO SERVICEMAGIC BY THURSDAY, MAY 18th, 02:38 PM TO ACCEPT OR REJECT THIS REFERRAL. We have sent this initial notice to five companies that matched. Only the first three companies to accept the referral will be presented to the customer - please respond as soon as possible. Here is the general referral information:

Job Number : 7904
Description : Remodel a Bathroom
Location : Golden, CO 09990
Customer's preferred
Start Date : 5 - 6 weeks
Timing : Flexible
Customer's estimated
Job Size : $5,001 - $10,000
Budget : Flexible

Age of Home : 6 - 10 Years
Size of Home : 2,000 - 2,999 sq.ft.
Property Type : Primary Home

Additional information:

Special requirements : I would like my antique tub to be the focal point of the bathroom
What is needed for basement project : Flooring
What is needed for basement project : Cabinetry/Countertops
What is needed for basement project : Electrical
What is needed for basement project : Painting/Staining
What is needed for basement project : Plumbing
Quality level : Luxury
Bathroom function : Master bath
Completed preparations : Cut outs or photos
Completed preparations : Sketches

To accept or reject, log onto http://www.ServiceMagic.com and select this job from the Active Projects in the "My Account" section. Otherwise, you can call our Automated Answering Service toll-free at (877) 947-3676 and enter your Account #. From the main menu, press "1" to listen to your New Leads, and then press "2" to respond to this specific job.

ServiceMagic.com Service Request Experience

Based on the Estimated Job Size, you will be charged a Job Win Fee of 0.07% if you win the job. This is only an estimate. The actual Job Win Fee will be based on the total cost of the job after the work is complete. Please refer to your ServiceMagic Fee Schedule for more information.

As a follow up, ServiceMagic will only send the customer contact information to the first three companies that accept the referral within 24 hours. If you are not one of the first three, you will be informed of your ineligibility for this referral when you respond.

Thanks, as always, for being a part of the ServiceMagic Community. Please contact us if you have any questions or comments.

Regards,

Blake Quinn
Director of Customer Service
(Toll-Free) (877) 947-3639
customerservice@ServiceMagic.com

ServiceMagic.com Service Request Experience

15. A Service Professional who was notified of the job logs in after going to www.servicemagic.com and clicking on My Account.

Log In

Enter Username here: cschmidt

Enter password here: ******

Forgot your password?

Would you like ServiceMagic to customize your experience so you won't have to sign in each time you return to our site?

○ Y  ● N

[Submit]

Home Services | Home | Communities | Resource Center | Help | Sitemap | Privacy Statement
My Account | What's New | Tell A Friend | About Us | Affiliate Partner Program | Contact Us ServiceMagic.com Service Request Experience
16. The Service Provider Clicks on Accept.
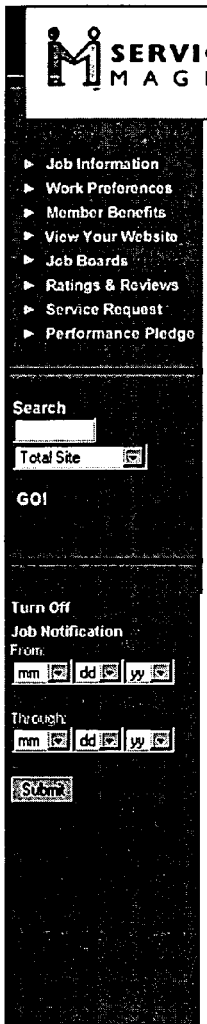

ServiceMagic.com Service Request Experience
17. The Service Provider submits an on-line bid.

ServiceMagic.com Service Request Experience

Service Request Details

| | |
|---|---|
| Job # | 7904 |
| Description | Remodel a Bathroom |
| Completed preparations | Cut outs or photos<br>Sketches |
| Bathroom function | Master bath |
| Square footage | 40 |
| What is needed for basement project | Flooring<br>Cabinetry/Countertops<br>Plumbing Electrical<br>Painting/Staining |
| Quality level | Luxury |
| Special requirements | I would like my antique tub to be the focal point of the bathroom |

Resource Center
- Refinishing Your Tired Deck
- How to Select a Service Professional
- Heirloom Gardening Tools ○ Get Free Internet Service!

Home | Job Information | Service Request | Job Boards | Resource Center | Help | Sitemap | Privacy Statement
Work Preferences | Member Services | Tell A Friend | About Us | Affiliate Partner Program | Contact Us ServiceMagic.com Service Request Experience 18. The Service Professional is presented with a summary page of their bid. The job goes to the Job Information Jobs in Progress Tab.

![Screenshot of ServiceMagic Job Information page showing Job Referral Accepted. Thanks for your online bid! This information will be provided to the customer. Next time you come back, this referral will be displayed in "Jobs in Progress". Job # 7904, Description: Remodel a Bathroom. Job Estimate: Earliest start date May 17, 2000. Materials estimate - TOTAL: 3000. Labor estimate - TOTAL: 1500. Project estimate - TOTAL: 4500. Project comments: Need more information for a more thorough estimate. The above estimates are based upon other customers with similar requests. Return to New Jobs.]

ServiceMagic.com Service Request Experience

19. A Second Service Professional who was notified of the job goes to www.servicemagic.com, logs in and accepts the job (7904).

ServiceMagic.com Service Request Experience

20. The second Service Provider accepts without an on-line bid.

ServiceMagic.com Service Request Experience

21. The job goes to the Job Information Jobs in Progress Folder

ServiceMagic.com Service Request Experience

22. A Service Professional who was notified of the job goes to www.servicemagic.com, logs in and rejects the job (7904).

JOB INFORMATION
HOME | RESOURCE CENTER | FEEDBACK | HELP

- Job Information
- Work Preferences
- Member Benefits
- View Your Website
- Job Boards
- Ratings & Reviews
- Service Request
- Performance Pledge Search
[Total Site]
GO!

Turn Off Job Notification
From: mm / dd / yy

New Jobs | Jobs in Progress | Closed Jobs

Accept, reject or view more information by clicking on the buttons to the right of each referral.

Assisted

| Job # | Description | Location | Job Size | Lead Time | Respond By | |
|---|---|---|---|---|---|---|
| 7773 | Remodel a Bathroom | Golden 09990 | $2,501 - $5,000 | 3 - 4 weeks | 05/17/00 8:44 PM | (Accept) (Reject) (View Details) |
| 7776 | Remodel a Bathroom | Golden 09990 | $10,001 - $25,000 | 9 - 12 weeks | 05/17/00 8:59 PM | (Accept) (Reject) (View Details) |
| 7790 | Remodel a Bathroom | Golden 09990 | $5,001 - $10,000 | 5 - 6 weeks | 05/17/00 10:41 PM | (Accept) (Reject) (View Details) |
| 7849 | Remodel a Bathroom | Golden 09990 | $10,001 - $25,000 | Over 12 weeks | 05/18/00 11:25 AM | (Accept) (Reject) (View Details) |
| 7904 | Remodel a Bathroom | Golden 09990 | $5,001 - $10,000 | 5 - 6 weeks | 05/18/00 2:38 PM | (Accept) (Reject) (View Details) |

Direct

| Job # | Description | Location | Job Size | Lead Time | Notified | |
|---|---|---|---|---|---|---|

23. The Service Professional is asked why they are rejecting the job. This information is for ServiceMagic use only and is not presented to the consumer. This job is stored in the Service Professionals Job Information Closed Jobs Folder.
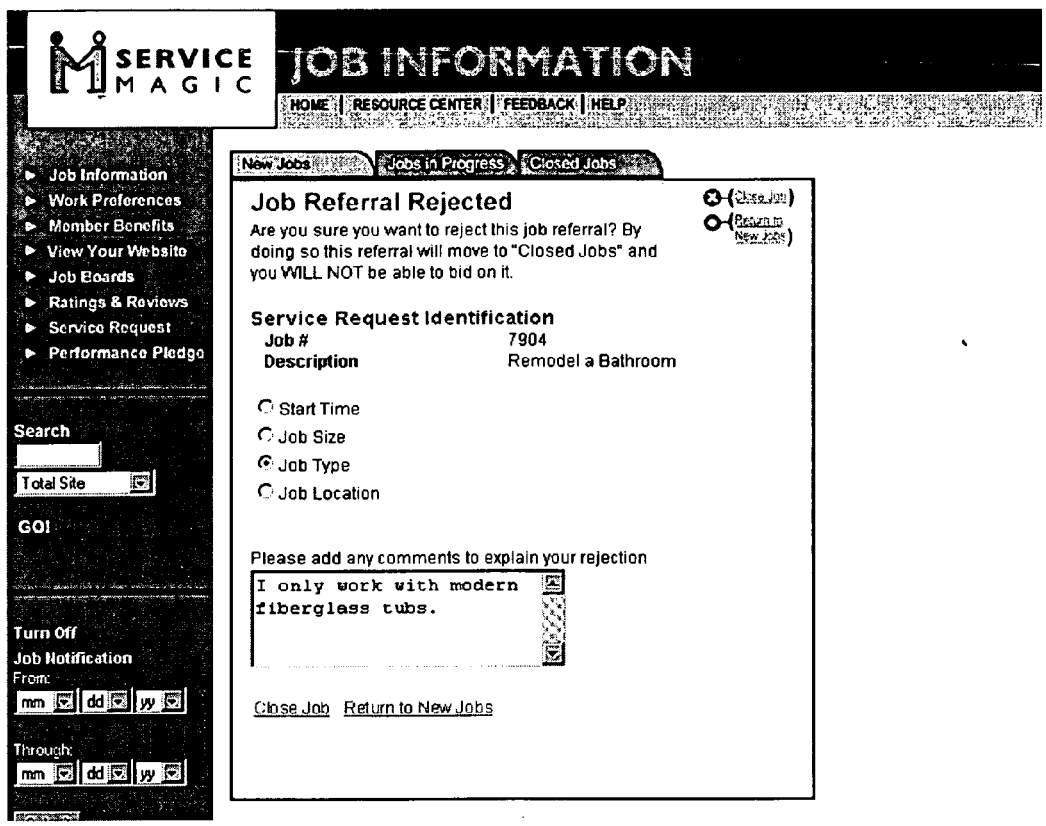

24. A third Service Professional who was notified of the job goes to www.servicemagic.com, logs in, accepts the job (7904( and enters an on-line bid.
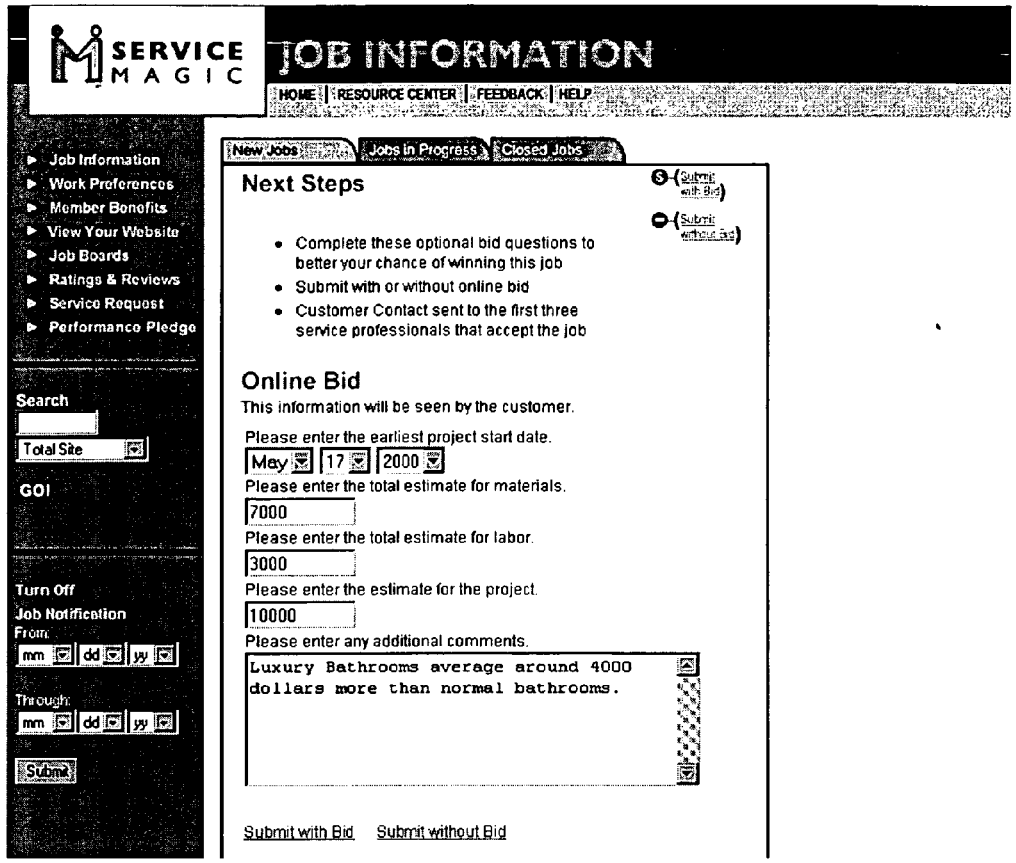

25. The Service Provider is presented with a summary of their bid.

JOB INFORMATION

HOME | RESOURCE CENTER | FEEDBACK | HELP

- Job Information
- Work Preferences
- Member Benefits
- View Your Website
- Job Boards
- Ratings & Reviews
- Service Request
- Performance Pledge Search Total Site

GO!

Turn Off
Job Notification
From: mm / dd / yy
Through: mm / dd / yy

New Jobs | Jobs in Progress | Closed Jobs

Job Referral Accepted     (Return to New Jobs)

Thanks for your online bid! This information will be provided to the customer. Next time you come back, this referral will be displayed in "Jobs in Progress".

| | |
|---|---|
| Job # | 7904 |
| Description | Remodel a Bathroom |

Job Estimate

Earliest start date.
May 17, 2000
Materials estimate - TOTAL.
7000
Labor estimate - TOTAL.
3000
Project estimate - TOTAL.
10000
Project comments.
Luxury Bathrooms average around 4000 dollars more than normal bathrooms.

Return to New Jobs

26. The job goes to the Job Information Jobs in Progress Folder.

| Job # | Description | Location | Status | |
|---|---|---|---|---|
| 5953 | Remodel a Bathroom | Golden 09990 | Waiting for Response | ○-(Update) |
| 6644 | Remodel a Bathroom | Golden 09990 | Waiting for Response | ○-(Update) |
| 6719 | Remodel a Bathroom | Golden 09990 | Waiting for Response | ○-(Update) |
| 6858 | Remodel a Bathroom | Golden 09990 | Waiting for Response | ○-(Update) |
| 7776 | Remodel a Bathroom | Golden 09990 | Bid & Waiting | ○-(Update) |
| 7849 | Remodel a Bathroom | Golden 09990 | Waiting for Response | ○-(Update) |
| 7904 | Remodel a Bathroom | Golden 09990 | Bid & Waiting | ○-(Update) |

27. The three Service Professionals that accepted are given the consumer information. The following is an example of an email sent to one of the three Service Professionals who accepted.

---

Hi Fred Lyman,

Thanks, as always, for being a part of the ServiceMagic Community. Please let us know if we can help you in any way.

We are confirming that you were one of the first three companies to accept this referral.

Job Number: 7904
Description: Remodel a Bathroom
Location: Golden, CO 09990
Customer's preferred
Start Date : 5 - 6 weeks
Timing : Flexible
Customer's estimated
Job Size : $5,001 - $10,000
Budget : Flexible

Please contact the customer at your earliest convenience, within the next 27 hours. The customer contact information is:

Customer Name : TEST Demo
Address : 25 Demo Lane, Consumer Suite
Golden, CO 09990
Telephone : (303)999-9999
Email :

Regards,

Blake Quinn
Director of Customer Service
(Toll-Free) (877) 947-3639
customerservice@ServiceMagic.com

28. The Consumer Gets email stating we have found three SPs

> Hi TEST Demo,
>
> Congratulations! We've found 3 ServiceMagic Member Service Professionals who are available and interested in your service project. You should expect to hear from them within the next 24 hours (excluding weekends), or feel free to contact them at your convenience.
>
> Job Number: 7904
> Description: Remodel a Bathroom
>
> Please log in to http://www.ServiceMagic.com and click on the project listed above. You'll find information on the ServiceMagic Member Service Professionals interested in your specific service need, including contact information and other instructions on how to proceed.
>
> And once your project is finished, please come back to the site and submit your rating and review. Your honest review of the service professional's performance will help your neighbors choose the right company for their next project. You can help make our community better.
>
> We appreciate that you have chosen to be part of ServiceMagic's Consumer Community, and we hope you'll visit regularly. We'll be adding new categories of service professionals as we grow, and we'll be able to connect you with more and more local services.
>
> Thanks for being a member of the ServiceMagic Community!
>
> Regards,
>
> Blake Quinn
> Director of Customer Service
> (Toll-Free) (877) 699-4736
> customerservice@ServiceMagic.com

29. Consumer clicks on the URL in the email http:/www.servicemagic.com, clicks on My Account, logs in and is told that job number 7904 has a certified match.

| 7904 | Remodel a Bathroom | 05/17/00 | Certified Match | view Results |

📁 Completed Projects

| SM # | Description | Submitted | Status | Action |
|---|---|---|---|---|
| 4332 | Install Cabinets | 03/26/00 | CLOSED | View Detail |
| 4333 | Install or Replace an Appliance | 03/26/00 | CLOSED | View Detail |
| 4334 | Install or Replace an Appliance | 03/26/00 | CLOSED | View Detail |
| 4386 | Install Hardwood Floors | 03/27/00 | CLOSED | View Detail |
| 4387 | Refinish Hardwood Floors | 03/27/00 | CLOSED | View Detail |
| 4408 | Install Finish or Trim Work | 03/28/00 | CLOSED | View Detail |
| 4409 | Purchase an Appliance | 03/28/00 | CLOSED | View Detail |
| 4410 | Refinish an Appliance | 03/28/00 | CLOSED | View Detail |
| 4412 | Clean Gutters | 03/28/00 | CLOSED | View Detail |
| 4416 | Find a Chimney or Fireplace Cleaning Service | 03/28/00 | CLOSED | View Detail |
| 5704 | Remodel a Bathroom | 04/20/00 | CLOSED | View Detail |
| 5949 | Install Hardwood Floors | 04/25/00 | CLOSED | View Detail |
| 5984 | Remodel a Bathroom | 04/25/00 | CLOSED | View Detail |

Consumer Profile

TEST Demo
25 Demo Lane Consumer Suite
Golden, CO 09990
(303) 233-3030
democonsumer@servicemagic.com

[CHANGE THIS]

30. The Consumer views results for Job Number 7904.

Confirmed ServiceMagic Match

The service professional(s) listed match your service request. They have confirmed availability and are ready to act. Soon the professional(s) will be contacting you. (If you wish to contact them - use the information provided.)

Bath Remodels For Less
1449 Shore Dr.
Suite 301
Seattle, WA 09990
(916) 777-7777 ext 888

Beautiful Home & Bath
1234 Canyon St.
Longmont, CO 09990
(303) 111-1111
demosp1@servicemagic.com Baths-R-Us
5678 Main St. South
Boulder, CO 09990
(303) 444-4444
demosp2@servicemagic.com

| | | | |
|---|---|---|---|
| ServiceMagic Rating | New Member | ★★★★✦ | New Member |
| Earliest start date. | May 17, 2000 | May 17, 2000 | |
| Materials estimate - TOTAL. | 7000 | 3000 | |
| Labor estimate - TOTAL. | 3000 | 1500 | |
| Project estimate - TOTAL. | 10000 | 4500 | |
| Project comments. | Luxury Bathrooms average around 4000 dollars more than normal bathrooms. | Need more information for a more thorough estimate. The above estimates are based upon other customers with similar requests. | |
| | Company Profile Send Message Ratings & Reviews | Company Profile Send Message Service Professional's ServiceMagic Web Site Service Professional's Company Web Site Ratings & Reviews | Company Profile Send Message Ratings & Reviews |

Finished with your project?
Rate your service professional

○ View Service Request

Return to Home

31. The consumer has the option to view the Company Profiles, Send a message to the Service Professional, view their Web Sites, and their Ratings and Reviews. The following pages are examples of this information for one Service Professional.
   a. Company Profile

b. Send Message to a Service Professional
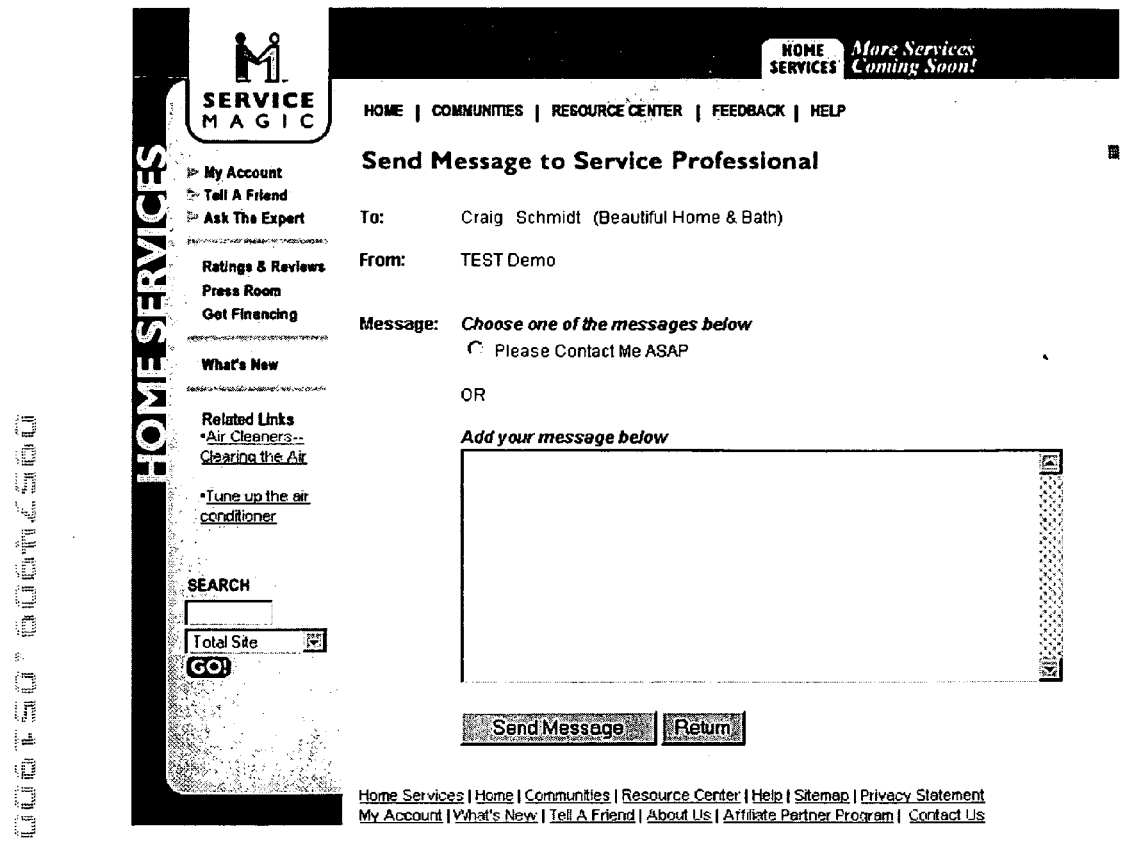

c. View the Service Professionals ServiceMagic Web Site.
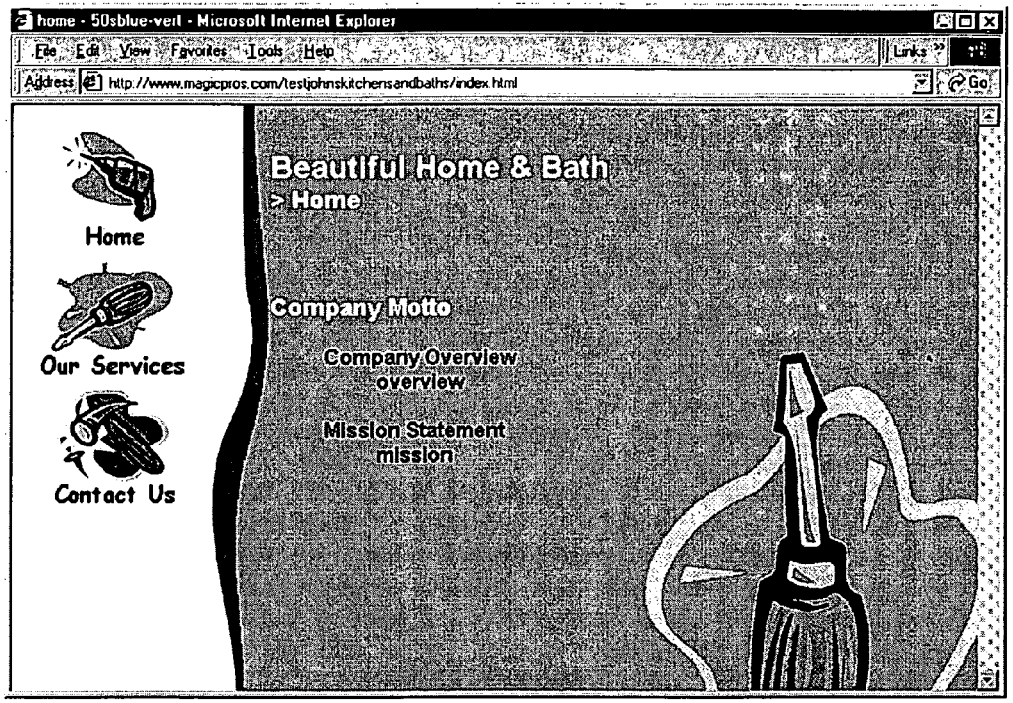
d. If the Service Professional has their own Web Site, the consumer has a link to view that Web Site.

e. The Consumer can view the Ratings and Reviews given by other ServiceMagic consumers.

Ratings and Reviews

The summary below represents work completed by this service professional in your neighborhood. We encourage all members to participate in the rating and review process to ensure that ServiceMagic connects you to the right professional every time.

Beautiful Home & Bath

ServiceMagic Rating
★★★★✦

Timeliness
Cleanliness
Budget
Quality of Work
Value
Overall Satisfaction

32. The Consumer chooses a Service Professional. Work is scheduled and performed. Then the consumer comes back to ServiceMagic and selects that they are finished with their project (See Step 30 bottom of picture). They are given details about the job, presented with their matched Service Professionals and asked to rate them.

SERVICE MAGIC

HOME | COMMUNITIES | RESOURCE CENTER | FEEDBACK | HELP

- My Account
- Tell A Friend
- Ask The Expert
- Ratings & Reviews
- Press Room
- Get Financing
- What's New
- Related Links
  - Air Cleaners--
  - Clearing the Air
- When to Re-roof SEARCH
Total Site
GO!

Ratings and Reviews

We Care - how did the project go?
Give us your feedback! This is your chance to rave (or rant) about the service professional's history with ServiceMagic. Your responses will become part of this service professional's history with ServiceMagic. Your anonymous responses will help community members find the right service professional every time.

Service Request Identification
| | |
|---|---|
| ServiceMagic # | 7904 |
| ServiceMagic Description | Remodel a Bathroom |
| Your Description | Remodel a Bathroom |

Property Profile and Matching Information
| | |
|---|---|
| Customer | TEST Demo |
| Residence | 25 Demo Lane, Consumer Suite<br>Golden, CO 09990<br>(H)(303) 233-3030<br>(W) |
| Contact Times | weekdays between 6:00pm and 8:00pm |
| Contact Preference | (303) 999-9999 |
| Home Age | 6 - 10 Years |
| Home Size | 2,000 - 2,999 sq.ft. |
| Home Owner | Y |
| Property Type | Primary Home |
| Estimated Job Size | $5,001 - $10,000 |
| Preferred Start Date | 5 - 6 weeks |
| Historical Work | No |
| Covered by Insurance | No |
| Required for a Home Closing | No |

Which of the following Service Professional's completed your job?
- ○ Bath Remodels For Less 1449 Shore Dr. Seattle WA 09990
- ○ Beautiful Home & Bath 1234 Canyon St. Longmont CO 09990
- ○ Baths-R-Us 5678 Main St. South Boulder CO 09990
- ○ Other Service Professional
- ○ Work was not performed

[Submit]

Home Services | Home | Communities | Resource Center | Help | Sitemap | Privacy Statement
My Account | What's New | Tell A Friend | About Us | Affiliate Partner Program | Contact Us 33. The Consumer completes the Ratings and Reviews for the Service Professional who completed their project.

Quality of Work provided

○ Very Poor  ○ Poor  ○ Fair  ○ Good  ⦿ Very Good

Overall Value offered in terms of quality and price

○ Very Poor  ○ Poor  ○ Fair  ⦿ Good  ○ Very Good

Overall Satisfaction

○ Very Poor  ○ Poor  ○ Fair  ⦿ Good  ○ Very Good

Please provide any additional comments.

```
Thank You ServiceMagic - the room looks
great.
```

[Submit]  [Clear Form]

Home Services | Home | Communities | Resource Center | Help | Sitemap | Privacy Statement
My Account | What's New | Tell A Friend | About Us | Affiliate Partner Program | Contact Us 34. When the Service Professional views the job it is in their Job Information Closed Jobs Folder.

35. A separate billing process happens between the Service Professional and ServiceMagic. The Consumer is not impacted by this process.

What is claimed is:

1. A computer-implemented method for matching a consumer with a home service provider comprising:
   creating a database comprising home service providers and data for tracking a historical acceptance of consumer leads by each home service provider;
   receiving information relating to a home service;
   in response to receiving the information, providing a first list comprising tasks that relate to skills of home service providers;
   receiving a selection of a task from the first list;
   in response to receiving the selection of the task, forming a second list comprising home service providers from the database who match the selected task;
   selecting home service providers from the second list based upon historical acceptance of consumer leads by home service providers; and
   providing a third list comprising home service providers.

2. The method of claim 1, further comprising selecting home service providers who match a geographical location of the consumer.

3. The method of claim 1, further comprising prioritizing home service providers of the second list based on the historical acceptance leads by home service providers.

4. The method of claim 1, further comprising selecting home service providers from the second list based upon past response times of each respective home service provider.

5. The method of claim 1, further comprising receiving background information from home service providers.

6. The method of claim 1, wherein creating the database comprises storing information comprising at least one of tasks performed by a home service provider, geographic region of operation, service response and fulfillment time, communication preferences, and preferences for tasks.

7. The method of claim 1, further comprising sending a message that identifies a consumer to a home service provider present in the third list.

8. A computer-implemented method for matching a consumer with a home service provider comprising:
   receiving background information from home service providers;
   monitoring a historical acceptance of consumer leads by each home service provider;
   creating a database of home service providers based on the background information received from the home service providers;
   receiving information relating to a home service;
   in response to receiving the information, providing a menu comprising tasks that relate to skills of home service providers;
   receiving a selection of a task from the menu;
   in response to receiving the selection of the task, forming a dataset comprising home service providers from the database who match the selected task; and
   selecting home service providers from the dataset based upon historical acceptance of consumer leads by home service providers.

9. The method of claim 8, wherein forming the dataset further comprises selecting home service providers who match a geographical location of the consumer.

10. The method of claim 8, wherein forming the dataset further comprises prioritizing home service providers of the dataset based on the historical acceptance of consumer leads by home service providers.

11. The method of claim 8, wherein forming the dataset further comprises prioritizing home service providers of the dataset based on past response times to service request.

12. The method of claim 8, further comprising providing a dataset comprising home service providers to the consumer.

13. The method of claim 8, wherein the background information comprises tasks performed by a home service provider, geographic regions of operation, service response and fulfillment time, communication preference, and preferences for desired tasks.

14. The method of claim 8, further comprising sending a message identifies a consumer to a home service provider present in the data set.

15. A system for matching a consumer with a home service provider via a distributed electronic network comprising:
   a database accessible via the distributed electronic network for storing background information on home service providers and for storing a historical acceptance of consumer leads by each home service provider; and
   a host server for communicating with the database and with a network device via the distributed electronic network and for executing computer-executable instructions for:
      receiving information relating to a home service;
      in response to receiving the information, providing a menu comprising tasks that relate to skills of home service providers;
      receiving a selection of a task from the menu;
      in response to receiving the selection of the task, forming a dataset comprising home service providers from the database who match the selected task; and;
      selecting home service providers from the dataset based upon historical acceptance of consumer leads by home service providers.

16. The system of claim 15, wherein forming the dataset further comprises selecting home service providers who match a geographical location of the consumer.

17. The system of claim 15, wherein the network device comprises a personal computer running an Internet browser application.

18. The system of claim 15, wherein the host server executes instructions for providing a dataset to the consumer via the Internet.

19. The method of claim 15, wherein the host server provides a dataset comprising home service providers to the consumer.

20. The method of claim 15, wherein the host server prioritizes home service providers of the dataset based on the historical acceptance of consumer leads by home service providers.

* * * * *